US00RE49852E

(19) United States
(12) Reissued Patent
Gallo et al.

(10) Patent Number: US RE49,852 E
(45) Date of Reissued Patent: Feb. 27, 2024

(54) FLAME SIMULATING ASSEMBLY WITH FLICKER ELEMENT INCLUDING PADDLE ELEMENTS

(71) Applicant: GLEN DIMPLEX AMERICAS LIMITED, Cambridge (CA)

(72) Inventors: Ignazio Gallo, Cambridge (CA); Michael Jach, Kitchener (CA)

(73) Assignee: Glen Dimplex Americas Limited (CA)

(21) Appl. No.: 16/546,824

(22) Filed: Aug. 21, 2019

Related U.S. Patent Documents

Reissue of:
(64) Patent No.: 9,739,433
Issued: Aug. 22, 2017
Appl. No.: 15/444,994
Filed: Feb. 28, 2017

U.S. Applications:
(63) Continuation-in-part of application No. 14/845,527, filed on Sep. 4, 2015, now Pat. No. 9,709,229.

(60) Provisional application No. 62/129,188, filed on Mar. 6, 2015.

(51) Int. Cl.
*F21S 10/04* (2006.01)
*F21V 14/04* (2006.01)
*F21V 17/10* (2006.01)
*F24C 7/00* (2006.01)

(52) U.S. Cl.
CPC ..... *F21S 10/046* (2013.01); *F24C 7/004* (2013.01)

(58) Field of Classification Search
CPC ..... F21S 10/046; F21V 14/04; F21V 17/108; F24C 7/004; F21Y 2115/10
USPC ..... 362/234, 235, 253, 806, 810; 40/428
See application file for complete search history.

(56) References Cited

U.S. PATENT DOCUMENTS 3,699,697 A 10/1972 Painton
7,210,256 B2 * 5/2007 Rosserot ..... F24C 7/004 40/428
8,739,439 B2 * 6/2014 Asofsky ..... F24C 7/004 40/428
8,904,681 B2 * 12/2014 Pan ..... F21S 10/04 40/428
9,453,627 B1 * 9/2016 Chen ..... F21S 10/046
(Continued)

FOREIGN PATENT DOCUMENTS

CN 201547676 U 8/2010

OTHER PUBLICATIONS

Machine English translation for CN201547676.

*Primary Examiner* — Henry N Tran
(74) *Attorney, Agent, or Firm* — Fishman Stewart PLLC

(57) ABSTRACT

A flame simulating assembly including light source(s), a screen to which light from the light source(s) is directed, to provide images of flickering flames thereon, and a rotatable flicker element for reflecting the light from the light sources toward the screen. The flicker element includes a number of paddle elements located in respective predetermined locations on the rod. Each paddle element includes one or more body portions with reflective surfaces thereon. The reflective surface includes a central region and a perimeter region at least partially located around the central region, the perimeter region at least partially defining a perimeter plane. The central region is substantially non-planar and the perimeter region is at least partially planar. The perimeter region includes a middle part and side parts, partially separated by channels.

21 Claims, 25 Drawing Sheets

(56) References Cited

U.S. PATENT DOCUMENTS

| | | | | |
|---|---|---|---|---|
| 2004/0060213 | A1* | 4/2004 | Schroeter | F24C 7/004 40/428 |
| 2009/0220221 | A1 | 9/2009 | Zhou | |
| 2010/0188859 | A1 | 7/2010 | Zhao | |
| 2011/0127914 | A1* | 6/2011 | Patton | F21S 10/04 315/76 |

* cited by examiner

FLAME SIMULATING ASSEMBLY WITH FLICKER ELEMENT INCLUDING PADDLE ELEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *Reissue application off U.S. patent application Ser. No. 15/444,994, filed Feb. 28, 2017, now U.S. Pat. No. 9,739,433, issued Aug. 22, 2017, which is a* continuation-in-part of U.S. patent application Ser. No. 14/845,527, filed on Sep. 4, 2015, *now U.S. Pat. No. 9,709,229, issued Jul. 18, 2017,* and claims the benefit of U.S. Provisional Patent Application No. 62/129,188, filed on Mar. 6, 2015, the entirety of each of which is hereby incorporated by reference.

FIELD OF THE INVENTION

The present invention is a flame simulating assembly with a flicker element including a rod and a number of paddle elements located on the rod in predetermined locations.

BACKGROUND OF THE INVENTION

In the typical electric fireplace, images of flames are created by projecting light onto a screen, and the flame images are moved generally upwardly on the screen. In the prior art electric fireplace, however, the light intensity across each of the flame images tends to be substantially uniform. This is thought to be undesirable because it is unrealistic, as real flames tend to have variations in intensity across their respective breadths.

In addition, the typical electric fireplaces tend to provide intermittent flashes of light on the screen thereof that travel in a partially transverse direction, rather than generally upwardly. These transversely travelling flashes are unlike flames in a real wood or coal fire. The transversely travelling light flashes therefore tend to undermine the realistic effect that is sought to be achieved.

SUMMARY OF THE INVENTION

There is a need for a flame simulating assembly that overcomes or mitigates one or more of the disadvantages or defects of the prior art. Such disadvantages or defects are not necessarily included in those described above.

In its broad aspect, the invention provides a flame simulating assembly including light source(s), a screen to which light from the light source(s) is directed, to provide a number of images of flickering flames thereon, and a rotatable flicker element. The flicker element includes an elongate rod defined by an axis thereof about which the rod is rotatable and a number of paddle elements located in respective predetermined locations on the rod. Each paddle element includes one or more body portions having one or more reflective surfaces thereon. Each reflective surface includes a central region and a perimeter region at least partially located around the central region, the perimeter region at least partially defining a perimeter plane. The paddle elements are located in the respective predetermined locations therefor to position the perimeter plane substantially perpendicular to the axis, for intermittently reflecting the light from the light source(s) from the reflective surfaces to predetermined regions on the screen respectively as the flicker element rotates about the axis, to provide the images of flickering flames on the screen. The central region is substantially non-planar and the perimeter region is at least partially planar, to cause the light reflected therefrom to the screen as the flicker element rotates to have varying intensity at the respective predetermined regions on the screen. The perimeter region includes one or more middle parts and one or more side parts. The middle part is at least partially defined by one or more channels partially separating the middle part and the side part(s).

In another aspect, the invention provides a paddle element including at least one body portion having one or more reflective surfaces thereon. The reflective surface includes a central region and a perimeter region at least partially located around the central region. Each body portion includes a first side and an opposed second side, and at least a selected one of the first and second sides includes one or more reflective surfaces. The central region on the first side is at least partially convex relative to the perimeter region on the first side, and the central region on the second side is at least partially concave relative to the perimeter region on the second side. The perimeter region includes one or more middle parts and one or more side parts. The middle part and the side part are separated by one or more channels.

In yet another of its aspects, the invention provides a flicker element that includes a number of paddle elements and an elongate rod defined by an axis thereof about which the rod is rotatable. The rod includes a rod body, and a number of mounting elements located on the rod body for positioning the paddle elements in respective predetermined locations along the rod. Each paddle element includes one or more body portions having one or more reflective surfaces thereon. The reflective surface includes a central region and a perimeter region located at least partially around the central region. The perimeter region includes a middle part and side parts. The middle part and the side part are partially separated by respective channels. The reflective surfaces on each of the paddle elements intermittently reflect light from the light source to provide the flickering light.

BRIEF DESCRIPTION OF THE DRAWINGS

The invention will be better understood with reference to the attached drawings, in which.

DETAILED DESCRIPTION

Figure 1A:
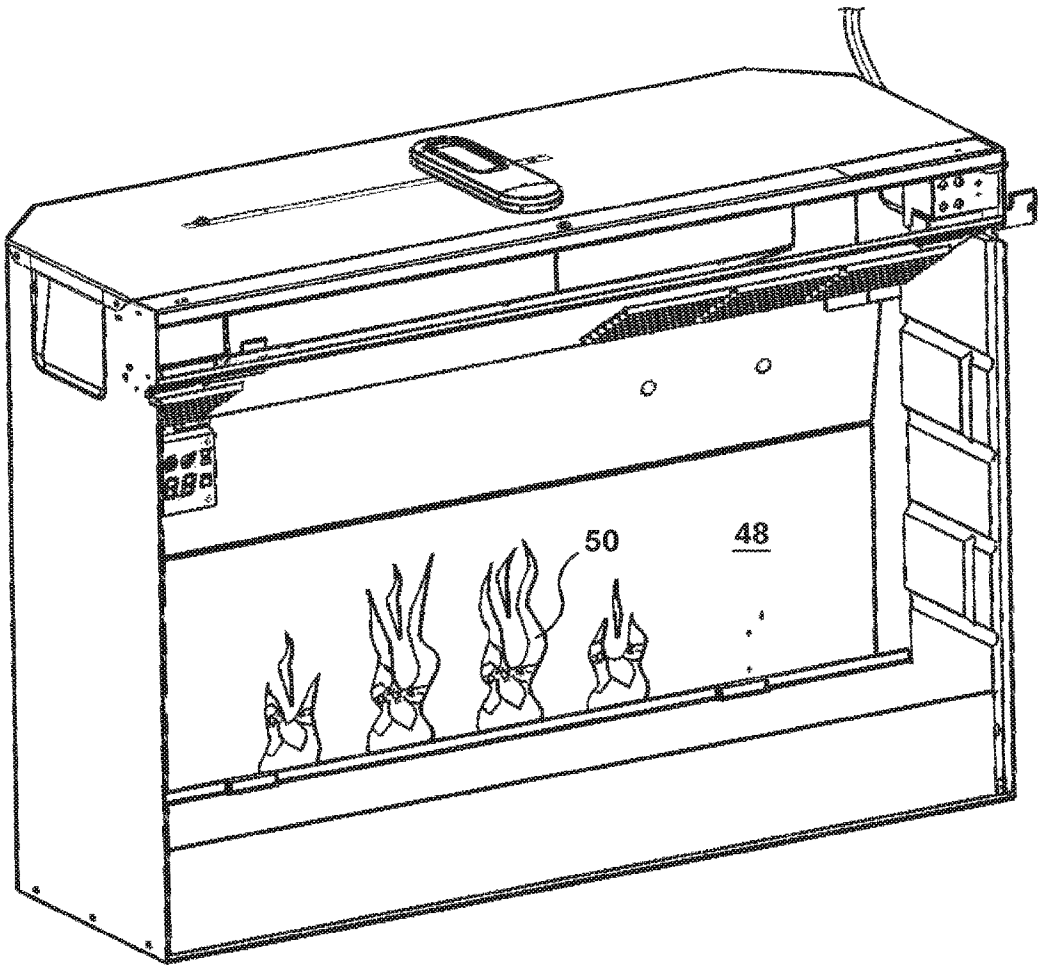
FIG. 1A is an isometric view of a front side of an embodiment of a flame simulating assembly of the invention in which a screen is omitted.
Figure 1B:
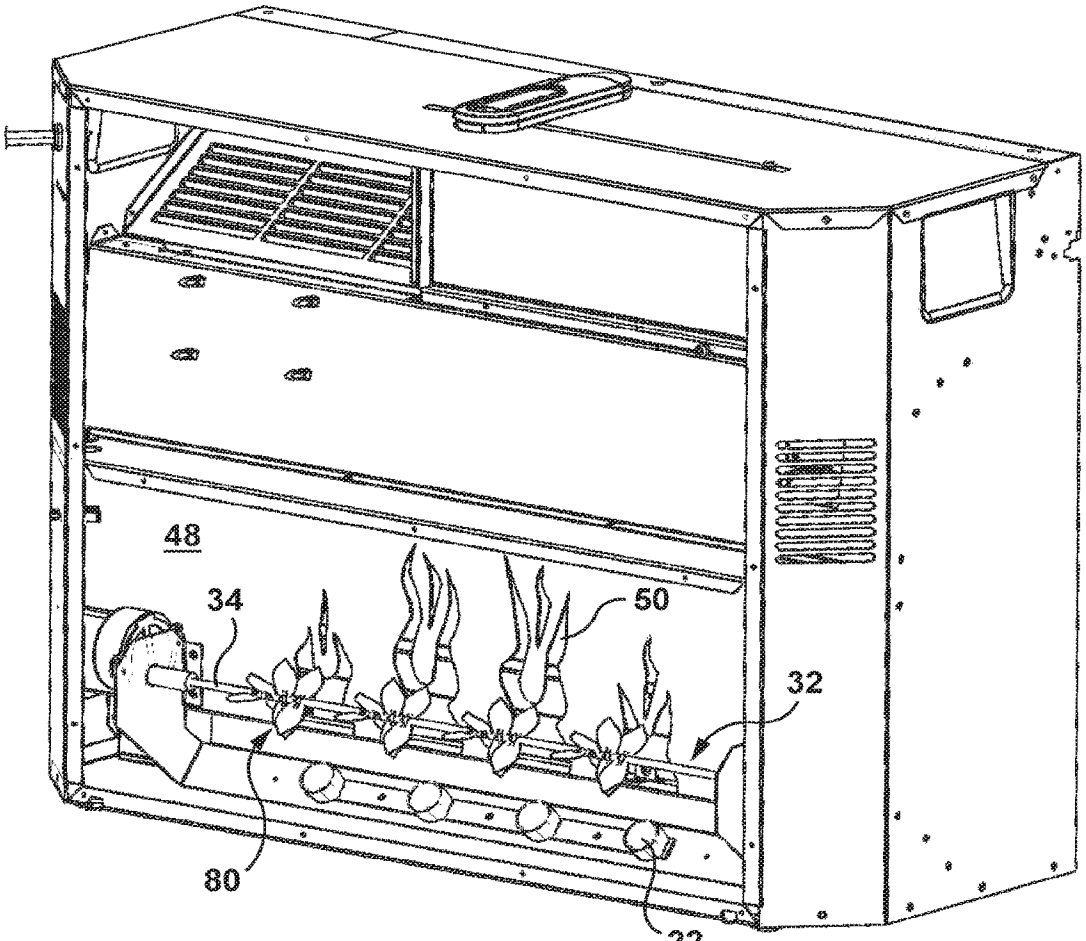
FIG. 1B is an isometric view of a back side of the flame simulating assembly of FIG. 1A.

In the attached drawings, like reference numerals designate corresponding elements throughout. Reference is first made to FIGS. 1A-1C and 1E-4D to describe an embodiment of a flame simulating assembly in accordance with the invention indicated generally by the reference numeral 20. In one embodiment, the flame simulating assembly 20 (FIGS. 1C, 1E) preferably includes one or more light sources 22 (FIGS. 1B, 1C) for producing light, and a screen 24 to which the light from the light source 22 is directed, to provide a number of images 26 of flickering flames thereon (FIG. 1E), as will be described. Preferably, and as can be seen in FIG. 1B, the flame simulating assembly 20 also includes a rotatable flicker element 32. In one embodiment, the flicker element 32 preferably includes an elongate rod 34 defined by an axis 36 thereof (FIGS. 2B, 4B) about which the rod is rotatable, and a number of paddle elements 38 located in respective predetermined locations on the rod 34 (FIGS. 1B, 1C, 2A, 2B), as will also be described. It is preferred that each of the paddle elements 38 includes one or more body portions 40 having one or more reflective surfaces 42 thereon (FIGS. 3A-3D). Preferably, each of the reflective surfaces 42 includes a central region 44 that is substantially centrally located on the reflective surfaces 42 and a perimeter region 46 at least partially located around the central region 44. As will also be described, the perimeter region 46 substantially defines a perimeter plane "PR" (FIGS. 3B, 3E, and 5A-5D). The paddle elements 38 are located to position the perimeter plane "PR" substantially parallel to the axis 36, for intermittently reflecting the light from the light source 22 from the reflective surfaces 42 to predetermined regions 47 on the screen 24 respectively (FIG. 1E) as the flicker element 32 rotates about the axis 36, to provide the image of flickering flames on the screen 24.

The flicker element 32 preferably positions the paddle elements 38 in respective preselected positions relative to the light source 22 to locate the reflective surfaces 42 on the respective paddle elements 38 to reflect the light from the light source 22 to the screen 24 intermittently as the flicker element 32 rotates about the axis 36, to provide the images 26 of flickering flames on the respective predetermined regions 47 on the screen 24.

Figure 3A:
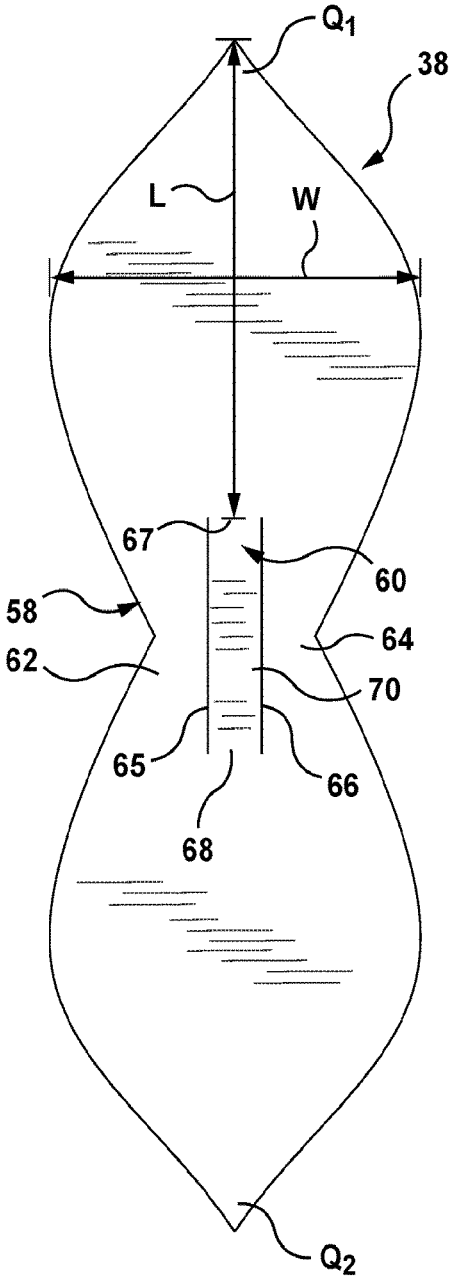
FIG. 3A is a top view of an embodiment of a paddle element of the invention, drawn at a larger scale.
Figure 3B:
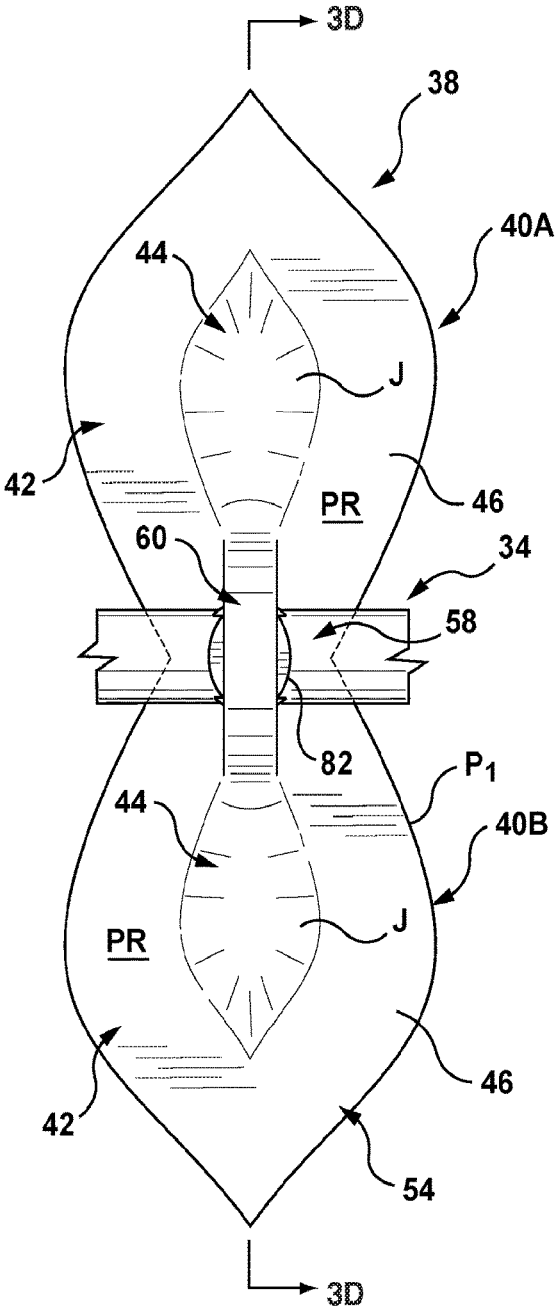
FIG. 3B is a top view of the paddle element of FIG. 3A when the paddle element is mounted on a rod in the flicker element of FIGS. 2A and 2B.
Figure 3C:
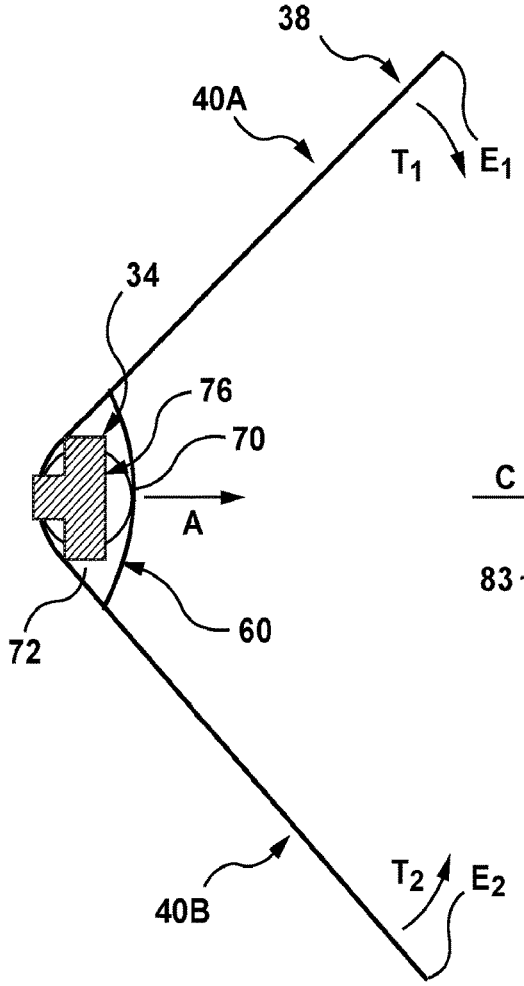
FIG. 3C is a side view of the paddle element and the rod of FIG. 3B.
Figure 3D:
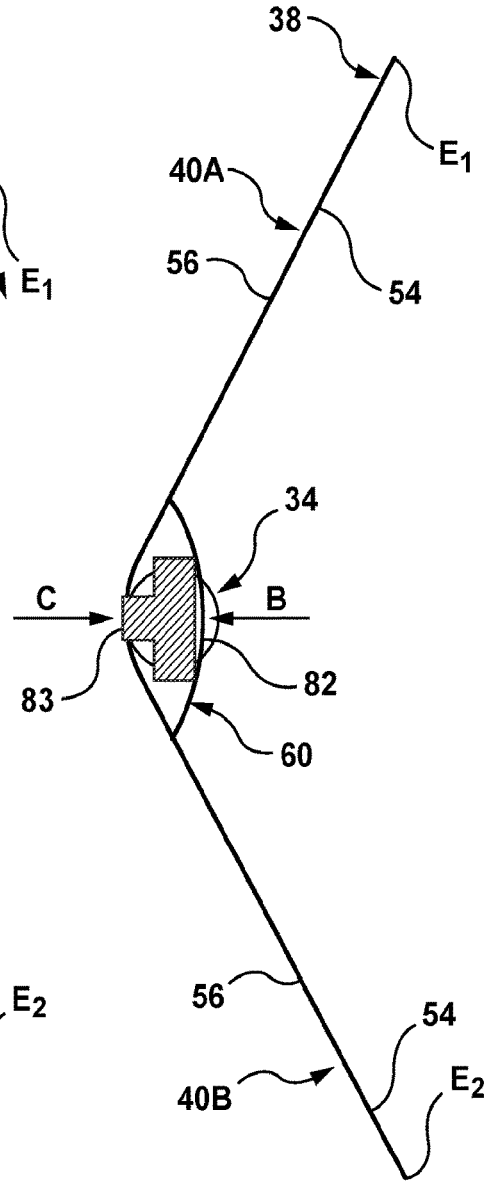
FIG. 3D is another side view of the paddle element and the rod of FIG. 3B.
Figure 3E:
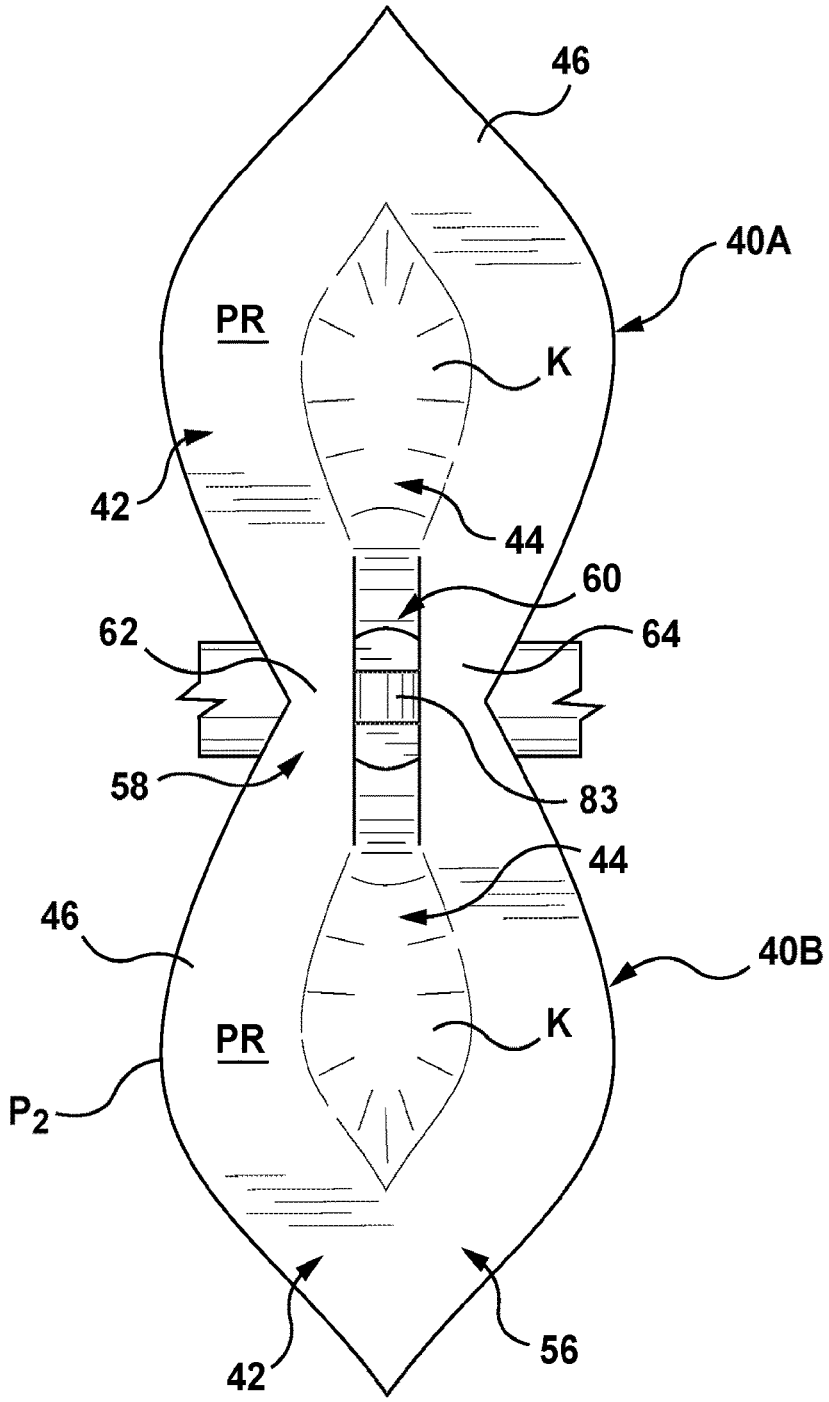
FIG. 3E is a back view of the paddle element and the rod of FIGS. 3B and 3C.

As can be seen in FIGS. 3B and 3E, the central region 44 preferably is substantially non-planar and the perimeter region 46 is at least partially planar, to cause the light reflected therefrom to the screen 24 as the flicker element 32 rotates to have varying intensity at the respective predetermined regions on the screen, as will also be described.

Figure 1C:
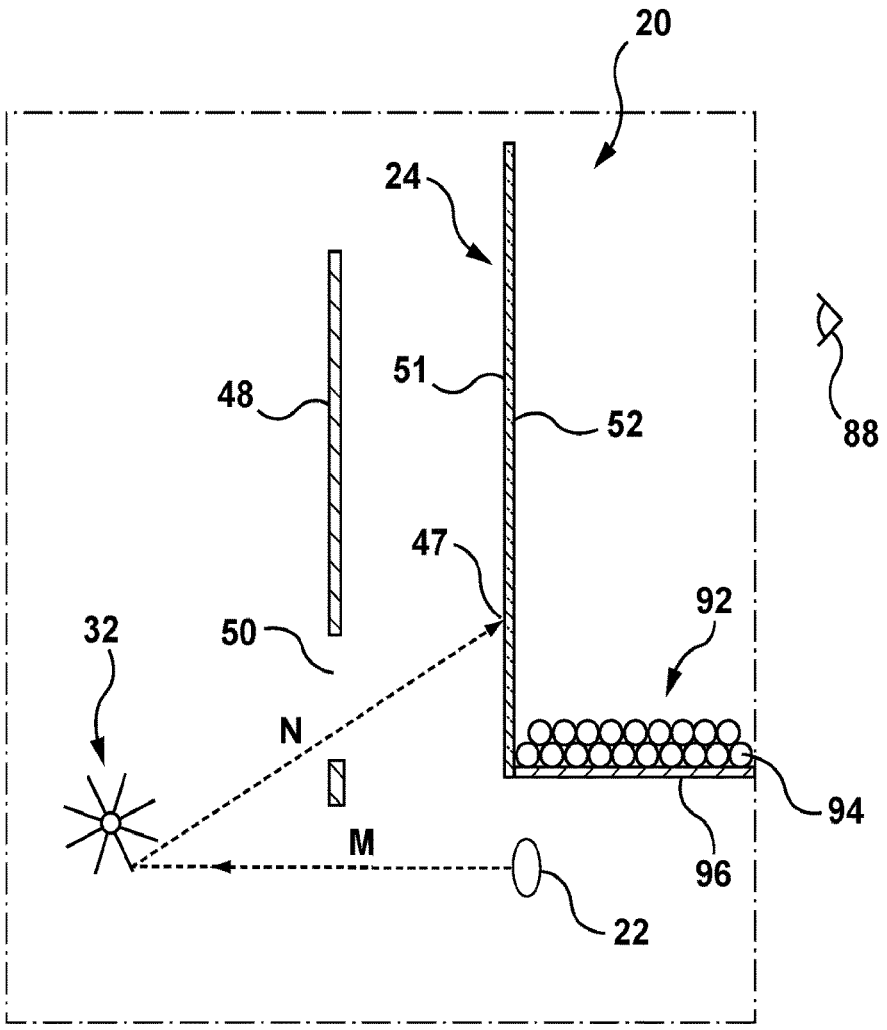
FIG. 1C is a cross-section of the flame simulating assembly of FIGS. 1A and 1B, drawn at a larger scale.

In one embodiment, the flame simulating assembly 20 preferably additionally includes a flame effect element 48 that has one or more apertures 50. It is preferred that the flame effect element 48 is positioned to permit the light reflected from the paddle elements 38 as the flicker element 32 rotates to pass through the aperture(s) 50, to provide the images 26 of flickering flames on a rear side 51 of the screen 24. As can be seen in FIG. 1C, in one embodiment, it is preferred that the light from the light source 22 is reflected to a rear side 51 of the screen. In one embodiment, the screen 24 preferably is at least partially transparent, so that the images 26 are viewable by an observer 88 observing a front side 52 of the screen 24 (FIGS. 1C, 1E). Those skilled in the art would appreciate that, in an alternative embodiment (not shown), the light from the light source may be reflected directly onto a front surface of the screen.

Preferably, the paddle elements 38 are located in a number of respective paddle element groups 80. Each paddle element group 80 preferably is located so that the light reflected by the paddle elements 38 in each paddle element group 80 respectively is directed to a selected one of the predetermined regions 47 on the screen 24.

In one embodiment, as can be seen in FIGS. 1C and 1E, the predetermined region 47 for each paddle element group 80 preferably is a relative small area of the screen 24. It will be understood that, in operation, the images of flames provided by a particular paddle element group 80 generally (intermittently) occupy substantially all of the predetermined region 47 for that paddle element group 80. In FIG. 1E, for clarity of illustration, only four predetermined regions 47 are shown. Also, for clarity of illustration, the images of flames 26 are shown as occupying the respective predetermined regions 47.

Preferably, each of the paddle elements 38 in each of the paddle element groups 80 is positioned to locate the body portions 40 thereof in predetermined radial positions relative to the body portions of the other paddle elements in the paddle element group therefor.

Preferably, the respective body portions 40 of the paddle elements 38 in each of the paddle groups 80 are positioned substantially at 45° radially relative to the respective body portions 40 of the paddle elements 38 adjacent thereto in the paddle element group 80 therefor, for reflection of the light from the light source 22 toward the selected one of the predetermined regions on the screen 24 for the paddle element group thereof when the rod 34 is rotated.

It will be understood that the body portions 40 of the paddle elements 38 in any selected paddle element group 80 may be positioned radially relative to each other in any desired relationship. In one embodiment, illustrated in FIG. 2B, the paddle element group 80 preferably includes four paddle elements. In the paddle element group 80 illustrated in FIG. 2B, the body portions are radially positioned at 45° relative to the body portions that are adjacent thereto. When the flicker element is rotated at an appropriate rotation speed, this arrangement appears to provide images of flames that flicker realistically. Those skilled in the art would appreciate that any suitable arrangement of the paddle elements in each paddle element group 80 may be used. As noted above, the rate of rotation of the flicker element preferably is taken into account when determining the arrangement of the paddle elements in the respective paddle element groups.

Preferably, and as can be seen in FIGS. 3A-3E, the body portion 40 includes a first side 54 and an opposed second side 56 thereof, and at least a selected one of the first and second sides 54, 56 includes the reflective surface 42. For clarity of illustration, in FIGS. 5A-5D, the central region and the perimeter region on the first side 54 are identified by reference numerals 44' and 46' respectively, and the central region and the perimeter region on the second side 56 are identified by reference numerals 44" and 46" respectively. In one embodiment, the central region 44' on the first side 54 preferably is at least partially convex relative to the perimeter region 46' on the first side 54, and the central region 44" on the second side 56 is at least partially concave relative to the perimeter region 46" on the second side 56.

As can be seen in FIGS. 3A-3E, in one embodiment, each of the paddle elements 38 preferably includes two body portions (identified by reference numerals 40A, 40B for convenience) connected by a bridge portion 58. Preferably, the bridge portion 58 includes an inner connector 60 and a pair of outer connectors 62, 64 generally located on opposite sides of the inner connector 60. As can be seen in FIG. 3B, the body portions 40A, 40B preferably are at least partially defined by respective perimeters "$P_1$", "$P_2$". It is preferred that the outlines of the body portions 40A, 40B (i.e., as defined by the perimeters "$P_1$". "$P_2$") are substantially the same, i.e., they are mirror images of each other.

For example, in one embodiment, the central region 44 on the first side 54 preferably is at least partially convex relative to the perimeter region 46 adjacent thereto, and the central region 44 on the second side 56 preferably is at least partially concave relative to the perimeter region 46 adjacent thereto (FIGS. 3B, 3E). When the paddle elements 38 are mounted on the rod 34, the paddle elements 38 preferably are subjected to tension as a result, and this causes the paddle elements 38 to be formed so that they have the central regions 44 that are bent or curved, to provide the non-planar regions. However, the perimeter regions, which are located around the respective central regions, preferably remain substantially planar after the paddle element 38 thereof is subjected to tension as aforesaid.

As will be described, the differences between the central region 44 and the perimeter region 46 result in differences in the light that is reflected from these two different regions of the reflective surface 42.

Those skilled in the art would appreciate that the paddle elements 38 may be formed of any suitable materials, and that the central region 44, and the perimeter region 46, may be formed in any suitable way. It is preferred that the paddle elements 38 include, or are made of, material that is highly reflective, i.e., adapted for specular reflection. As will also be described, it is also preferred that the paddle element 38 is made of material that is resilient and flexible. For example, it has been found that the paddle elements 38 may be made of reflective Mylar®, preferably from sheets that are approximately 7 mil (0.007 inch, or approximately 0.1778 mm) thick.

It will be understood that the paddle element 38 preferably is formed by cutting the paddle element 38 out of a sheet of suitable material, e.g., reflective Mylar®. Also, it is preferred that the outer connectors 62, 64 and the inner connector 60 are at least partially defined by cuts 65, 66 that partially separate the respective outer connectors 62, 64 and the inner connector 60 (FIG. 3A).

Alternatively, the paddle elements 38 and/or the body portions may be formed using any other suitable methods and materials. For example, the paddle elements and/or the body portions thereof may be formed using injection molding.

It will be understood that the body portions 40A, 40B and the bridge portion 58 may have any suitable size, shape or form. In one embodiment, and as can be seen in FIG. 3A, the body portions 40A, 40B preferably each have generally rounded sides and pointed or peaked outer ends $Q_1$, $Q_2$. The paddle element 38 preferably narrows at the bridge portion 58. Those skilled in the art would appreciate that the paddle element preferably is relatively small. For example, the body portion's width "W" from side to side may be a maximum of about 0.625 inch (approximately 1.59 cm), and the length "L" from the central connector 56 to the outer end may be a maximum of about 0.75 inch (approximately 1.91 cm) (FIG. 3A). In one embodiment, each of the body portions 40A, 40B preferably are approximately the same size and shape.

It is also preferred that the inner connector 60 is integrally formed with the body portions 40A, 40B. The outer connectors 62, 64 preferably are also integrally formed with the body portions 40A, 40B. In each paddle element 38, the inner connector 60 and the outer connectors 62, 64 preferably are separated only by the respective cuts 65, 66 therebetween, in the bridge portion 58.

As can be seen in FIG. 3B, the inner connector 60 preferably extends between its first and second ends 67, 68, where the inner connector 60 is integrally joined with the respective body portions 40A, 40B. Because of the cuts 65, 66, the inner connector's central portion 70 may be moved outwardly, i.e., away from the outer connectors 62, 64 (FIG. 3A). Such outward movement would be, for example, generally in the direction schematically indicated in FIG. 3C by arrow "A". As can be seen in FIG. 3C, when the central portion 70 is moved outwardly from the outer connectors 62, 64, an opening or space 72 is defined between the central portion 70 and the inner connectors 62, 64.

The paddle elements 38 may be positioned on the rod 34, and attached to the rod 34, in any suitable manner. In one embodiment, it is preferred that the rod 34 is inserted into the space 72 between the inner connector 60 and the outer connectors 62, 64 that is formed when the central portion 70 of the inner connector 60 is moved outwardly. That is, the rod 34 is moved in a generally axial direction into the space 72. After the rod 34 is positioned as desired relative to the paddle element 38, the inner connector 60 is released to engage the rod 34, as will be described. The paddle element 38 is secured to the rod 34 due to the tension to which the paddle element 38 is subjected as a result. Specifically, and as will be described, the inner connector 60 is urged against one side of the rod 34, and the outer connectors 62, 64 are simultaneously urged against an opposite side of the rod 34. This mounting arrangement is illustrated in FIGS. 3B-3E.

As noted above, the paddle element 38 preferably is formed out of a substantially flat sheet of material, e.g., the reflective Mylar® referred to above, that is relatively thin. Those skilled in the art would be aware of other suitable materials. Preferably, if the paddle element is formed out of a flat sheet of material, the material out of which the paddle element 38 is formed is resilient and flexible, however, the paddle element may be formed in various ways, out of any suitable material(s).

It will be understood that, when the central connector's central portion 70 is moved outwardly (i.e., in the direction indicated by arrow "A" in FIG. 3C), the inner connector 60 is also subjected to tension, as is most of the paddle element 38. When the inner connector's central portion 70 is pulled outwardly, each of the body portions 40A, 40B pivots inwardly about the outer connectors 62, 64 of the bridge portion 58. As a result, the body portions 40A, 40B are pivoted toward each other, as indicated by arrows "$T_1$" and "$T_2$" in FIG. 3C. As noted above, when the central portion 70 is moved outwardly, the opening 72 is thereby defined between the inner connector 60 and the outer connectors 62, 64, in which the rod 34 may be positioned. For instance, the rod 34 may be moved axially into the opening 72. It will be understood that, in FIG. 3C, the rod 34 is shown positioned in the opening 72.

Figure 4A:
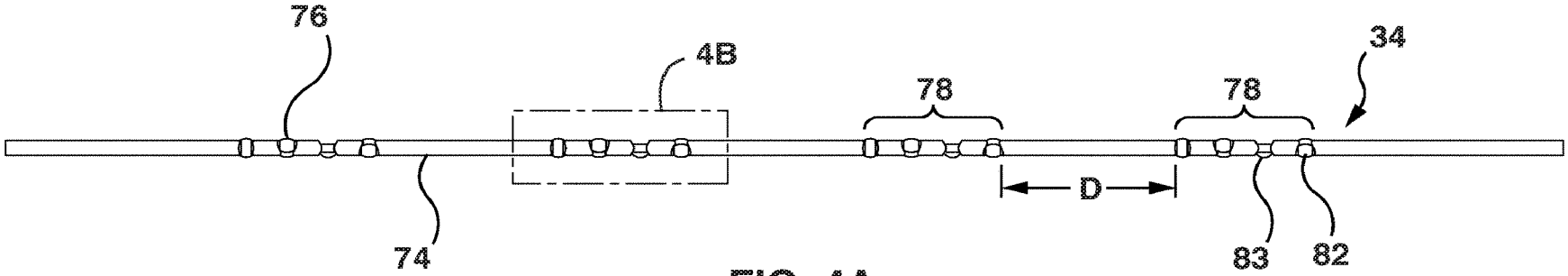
FIG. 4A is a top view of an embodiment of the rod of the invention, drawn at a smaller scale.
Figure 4B:
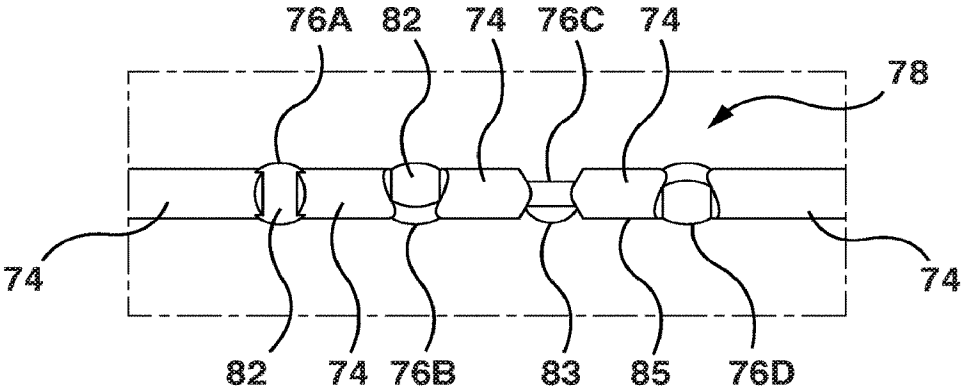
FIG. 4B is a top view of a portion of the rod of FIG. 4A, drawn at a larger scale.
Figure 4C:
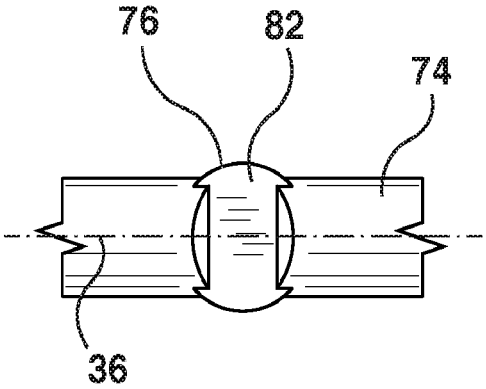
FIG. 4C is a top view of a detent on the rod of FIGS. 4A and 4B, drawn at a larger scale.

As can be seen in FIG. 4C, the outer connectors 62, 64 are urged against the rod 34 (i.e., also in the direction indicated by arrow "A" in FIG. 3C) when the inner connector 60 is moved outwardly and the rod 34 is positioned in the open space 72.

In one embodiment, each of the paddle elements 38 preferably is positioned at a predetermined location therefor on the rod 34. It is preferred that, when the rod 34 is positioned in the opening 72 so that a selected paddle element 38 is proximal to the predetermined location therefor, the inner connector 60 is released to allow the central portion 70 of the inner connector 60 to engage the rod 34 at the predetermined location for the selected paddle element 38. Preferably, when the inner connector 60 is urged against one side of the rod 34, the outer connectors 62, 64 also are urged against the other (opposite) side of the rod 34, due to the resilience of the paddle element 38.

As noted above, it is preferred that the paddle element 38 is resilient and flexible. Accordingly, in one embodiment, when the rod 34 is partially located in the space 72 and the inner connector 60 is released after it has been pulled outwardly, the inner connector 60 moves inwardly (i.e., in the direction indicated by arrow "B" in FIG. 3D) to engage the rod 34. Due to the resilience of the material of which the paddle element 38 is made, the central portion 70 of the inner connector 60 is urged against the rod 34, after the central portion 70 is released. Also, the outer connectors 62, 64 remain engaged, and are urged against the rod 34 (i.e., in the direction indicated by arrow "C" in FIG. 3D) when the inner connector 60 is released. When the inner connector 60 and the outer connectors 62, 64 engage the rod 34 as aforesaid, the selected paddle element 38 is mounted on the rod 34 in the predetermined location therefor.

From the foregoing, it can be seen that, once the paddle element 38 is mounted on the rod 34 in the predetermined location therefor, the inner connector 60 is urged against one side of the rod 34, and the outer connectors 62, 64 are urged against the opposite side of the rod 34. In this way, the paddle element 38 is relatively securely held in its predetermined location on the rod 34.

It will be understood that the above-described process of mounting the paddle element 38 on the rod 34, at the predetermined location therefor, may be accomplished using any suitable means. However, those skilled in the art would appreciate that the paddle element 38 preferably is manually mounted onto the rod 34 in the predetermined location therefor, i.e., the paddle element 38 preferably is manipulated to provide the space 72, the rod 34 is axially moved so that the paddle element is proximal to its predetermined location on the rod 34, and then the paddle element is manually released, to engage the rod at the predetermined location therefor.

From the foregoing, it can be seen that when the paddle element 38 is mounted on the rod 34 (FIGS. 3B, 3D, and 3E), the rod 34 prevents the paddle element 38 from returning to its original, substantially planar, profile (FIG. 3A). Accordingly, because the paddle element 38 is formed from a sheet of substantially planar material (FIG. 3A) and is resilient, when the paddle element 38 is mounted on the rod 34, the paddle element 38 is subjected to tension, which tension keeps the paddle element 38 mounted on the rod 34. In particular, and as can be seen in FIG. 3D, the central portion 70 of the inner connector 60 is held outwardly, in an extended position away from the outer connectors 62, 64, when the central portion 70 is released to engage the rod 34. Because it is connected to the body portions 40A, 40B via the ends 67, 68 of the inner connector 60, when the central portion 70 is pulled outwardly away from the outer connectors 62, 64, the body portions 40A, 40B are also subjected to tension. The ends 67, 68 are integrally formed with the body portions 40A, 40B and are located at the central region 44 of each body portion 40A, 40B. Because the body portions 40A, 40B are relatively thin and flexible, the central regions 44 of the body portions 40A, 40B tend to buckle or warp, as they are urged or pulled generally toward the rod 34 by the inner connector 60.

Due to the resilience of the paddle element 38 and because the rod 34 prevents the paddle element 38 from returning to its planar profile, the inner connector 60 and the outer connectors 62, 64 securely engage the rod 34 to hold the paddle element 38 thereof in the predetermined location therefor.

Those skilled in the art would appreciate that the rod 34 may have any suitable form, and may be made of any suitable materials. The rod 34 preferably is made of a suitable metal or alloy, e.g., a suitable steel. Alternatively, the rod 34 may be made of any suitable plastic or composite material(s). In one embodiment, the rod 34 preferably includes one or more main portions 74 thereof.

In one embodiment, the main portions 74 preferably are generally cylindrical and elongate (FIGS. 2A, 2B, 4A, 4B). Preferably, the main portions 74 are coaxial with the axis 36 of the rod 34.

It is also preferred that the rod 34 includes any suitable means for positioning the paddle elements 38 in the predetermined locations therefor on the rod 34. In one embodiment, the rod 34 preferably includes a number of detents 76 formed for positioning the paddle elements 38 in the respective predetermined locations therefor. As can be seen in FIGS. 4A and 4B, the detents 76 preferably are formed in a number of detent groups 78 and the paddle elements 38 mounted thereon comprise respective paddle element groups 80. The detent groups 78 preferably are spaced apart from each other along the rod 34 at preselected distances "D" (FIG. 4A), as will be described.

As noted above, the paddle elements 38 preferably are located in predetermined locations on the rod 34 to reflect the light from the light source(s) 22 to the screen 24, to provide the images of flickering flames 26 thereon. As is also noted above, the paddle elements 38 preferably are located on the rod 34 by respective detents 76, which preferably are formed in the detent groups 78.

It will be understood that the respective detent groups 78 may include any suitable number of detents 76, i.e., the paddle element groups 80 may include any suitable number of paddle elements 38. In one embodiment, each paddle element group 80 preferably includes four paddle elements 38. It is also preferred that the bridge portion 58 of each paddle element 38 in the paddle element group 80 respectively engages a selected one of the detents 76 in the detent group 78 therefor, to position each paddle element 38 in a predetermined radial position on the rod 34 relative to the other paddle elements 38 in the paddle element group 80 therefor.

Accordingly, and as noted above, the detent groups 78 preferably are respectively positioned along the rod 34 to substantially align the paddle element groups 80 respectively mounted thereon with respective selected ones of the apertures 50 in the flame effect element 48. For each respective paddle element group 80, the light from the light source 22 therefor is intermittently reflected from the body portions of the paddle elements thereof through the respective aperture therefor to the predetermined region on the screen for the paddle element group 80, where the light provides the images of flames.

It is also preferred that the flame simulating assembly 20 includes a number of light sources 22, and each of the individual light sources is respectively positioned to substantially direct the light therefrom to a selected one of the paddle element groups 80. Those skilled in the art would appreciate that any suitable light source(s) may be used. For instance, the flame simulating assembly 20 may include a number of light-emitting diodes ("LEDs"), and each of the LEDs preferably are located to direct the light therefrom toward respective paddle element groups 80, from which the light is reflected to the respective apertures 50. Accordingly, it is preferred that the individual LEDs are located generally proximal to respective apertures 50 in the flame effect element 48. As is known, the light generated by LEDs is relatively focused. As a result, the light generated by each of the LED light sources 22 preferably is relatively narrowly focused. Preferably, each of the light sources 22 is respectively positioned so that the light generated thereby is directed substantially toward the paddle element group 80 positioned to reflect the light toward the aperture 50 selected therefor. It will be understood that more than one light source 22 may be positioned to direct light therefrom to the paddle element group 80 to the selected aperture 50 therefor.

For example, in one embodiment, relatively high-powered LEDs may be used. An example of a suitable high-powered LED is a one-watt LED. It has been found that a single high-powered LED may be used for each respective paddle element group 80.

Alternatively, LEDs that are not high-powered may be used. Those skilled in the art would appreciate that a number of such LEDs may be positioned for use with each paddle element group respectively.

Those skilled in the art would also appreciate that the light produced from the light source(s), and reflected from the reflective surfaces, is the sum of the light in each case.

As can be seen in FIG. 1B, for example, each of the light sources 22 illustrated is positioned adjacent to a selected paddle element group 80, for transmission of the light from each light source 22 to the paddle element group 80 therefor. Each of the paddle element groups 80 is positioned to direct the light from the light source 22 adjacent thereto through the aperture 50 that is proximal to the paddle element group 80.

From the foregoing, it can be seen that the locations of the detent groups 78 on the rod 34, and the positioning of such locations relative to the flame effect element 48 when the flicker element 32 is installed in a preselected position therefor relative to the flame effect element 48, are predetermined. As noted above, the detent groups 78 are spaced apart on the rod 34 so that, when the paddle elements 38 are mounted on the rod 34 to form the respective paddle element groups 80 and the flicker element 32 is positioned in the preselected position therefor relative to the flame effect element 48, the paddle element groups 80 preferably are substantially aligned respectively with the apertures 50 in the flame effect element 48. In one embodiment, for instance, each detent group 78 preferably is spaced apart from the detent group(s) adjacent thereto by a preselected distance "D" (FIG. 4A). Those skilled in the art would appreciate that the spacings "D" between respective detents may not necessarily be the same distance in each case.

In FIG. 4B, the four detents in the detent group 78 illustrated therein are identified by the reference numerals 76A-76D, for clarity of illustration.

As noted above, in one embodiment, each of the paddle elements 38 preferably is positioned at approximately 45° radially relative to the paddle elements 38 immediately adjacent thereto in the paddle element group 80 thereof respectively. Because of the radial positioning of the paddle elements 38 in each of the paddle element groups 80 relative to the other paddle elements 28 thereof, the light from the light source(s) 22 is reflected thereby through the aperture 48 therefor toward the screen 24 at preselected intervals when the rod 34 is rotated. When the flicker element 32 is rotated, this radial arrangement of the paddle elements in each of the paddle groups 80 provides flame images at intervals so that the flame images 26 simulate a flickering flame.

As noted above, when the flame simulating assembly 20 is energized, each of the paddle elements 38 is moving, i.e., rotated about the axis 36 as the light from the light source(s) 22 is reflected from the reflective surfaces 42 of the respective paddle elements. Because each reflective surface 42 includes non-planar and planar surfaces, the light reflected therefrom towards the aperture 50 also flickers, i.e., the direction and intensity of the reflected light vary as long as the paddle element moves while the light is reflected therefrom.

The rod 34 may be rotated at any suitable rate, for example, between 10 rpm and 25 rpm.

Those skilled in the art would appreciate that the detents 76 may be formed in any suitable manner. Preferably, each of the detents 76 includes one or more first regions 82 and one or more second regions 83 for engagement with the inner connector 60 and the outer connectors 62, 64 respectively.

In one embodiment, and as can be seen in FIGS. 4A-4C, the first region 82 preferably is substantially planar. It is also preferred that the first region 82 of each detent 78 in each respective detent group 78 is located at a predetermined position located radially relative to each other (FIG. 4B), as noted above. In this way, the first region 82 of the detent 78 radially locates the paddle element 38 on it, in a preselected position relative to the other paddle elements 38 in the paddle element group 80 therefor. Preferably, the planar first regions 82 are located at 45° radially relative to the one or more first regions 82 in the same detent group that are adjacent thereto.

Figure 4D:
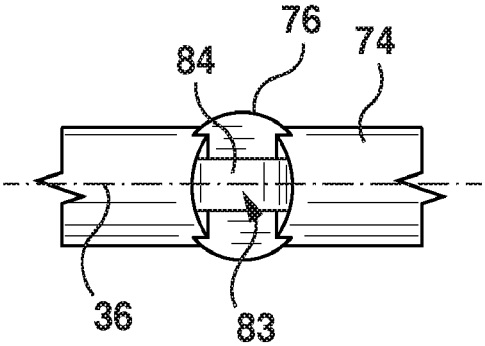
FIG. 4D is a back view of the detent of FIG. 4C.

As can be seen in FIG. 4D, in one embodiment, the detent 76 preferably also includes the second region 83 positioned substantially opposite to the first (planar) region 82. Those skilled in the art would appreciate that the second region 83 may have any suitable form. Preferably, the second region 83 forms a central ridge that includes an outer surface 84. In one embodiment, the central ridge 83 preferably locates the outer surface 84 thereof so that the outer surface 84 is at least partially substantially aligned with an outer surface 85 of the main portion 74 of the rod 34 (FIG. 4B). Alternatively, in another embodiment, the outer surface 84 extends outwardly, beyond the outer surface 85 of the substantially cylindrical main portion 74.

In one embodiment, each of the substantially planar regions 82 of the respective detents 76A-76D preferably is positioned at approximately 45° relative to the detents that are positioned adjacent thereto. For example, as shown in FIG. 4B, the planar region 82 of the detent 76A preferably is positioned to define a radial angle of approximately 45° relative to the planar region 82 of the detent 76B.

Figure 2A:
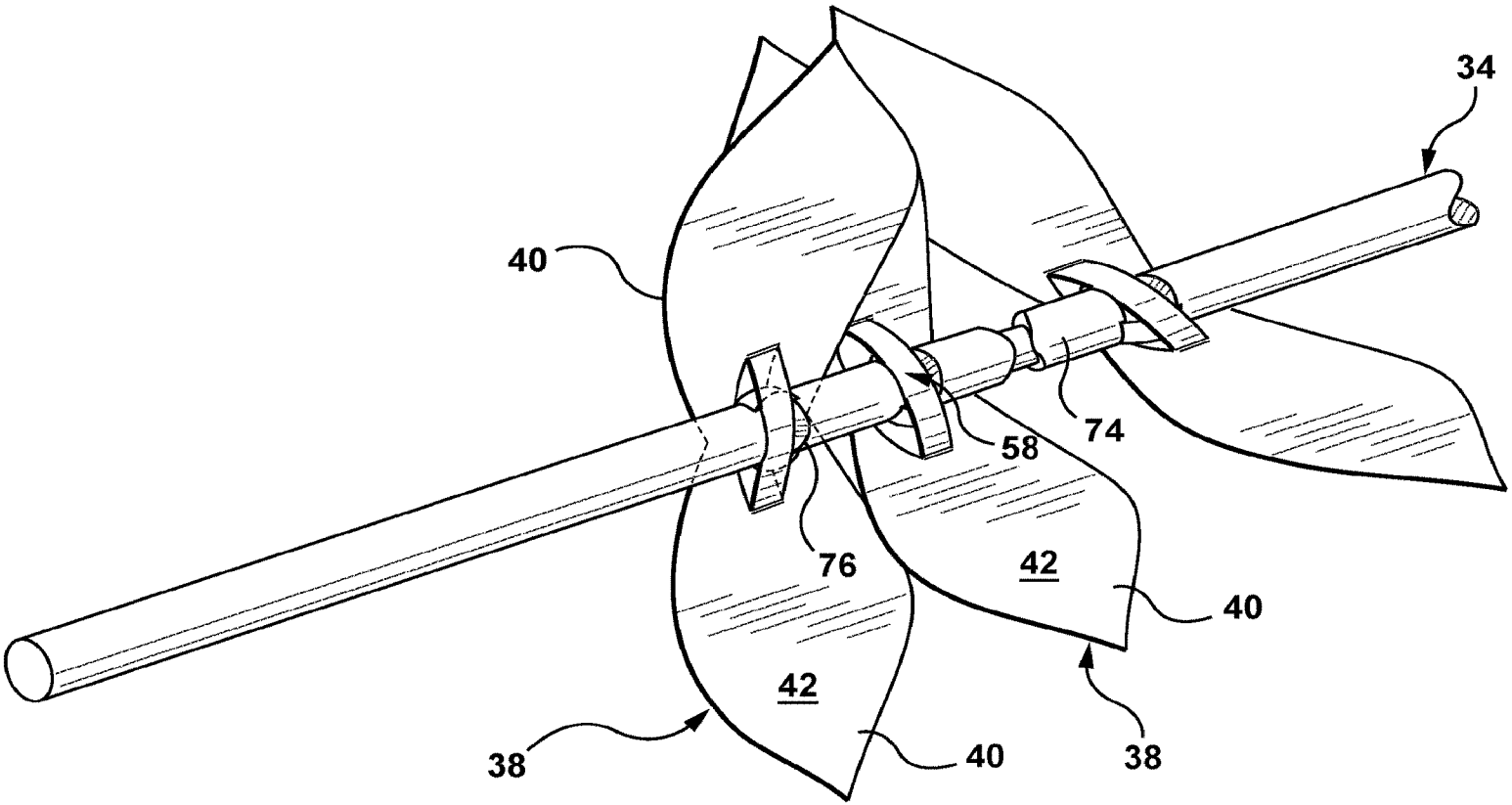
FIG. 2A is an isometric view of a portion of an embodiment of a flicker element of the invention, drawn at a larger scale.
Figure 2B:
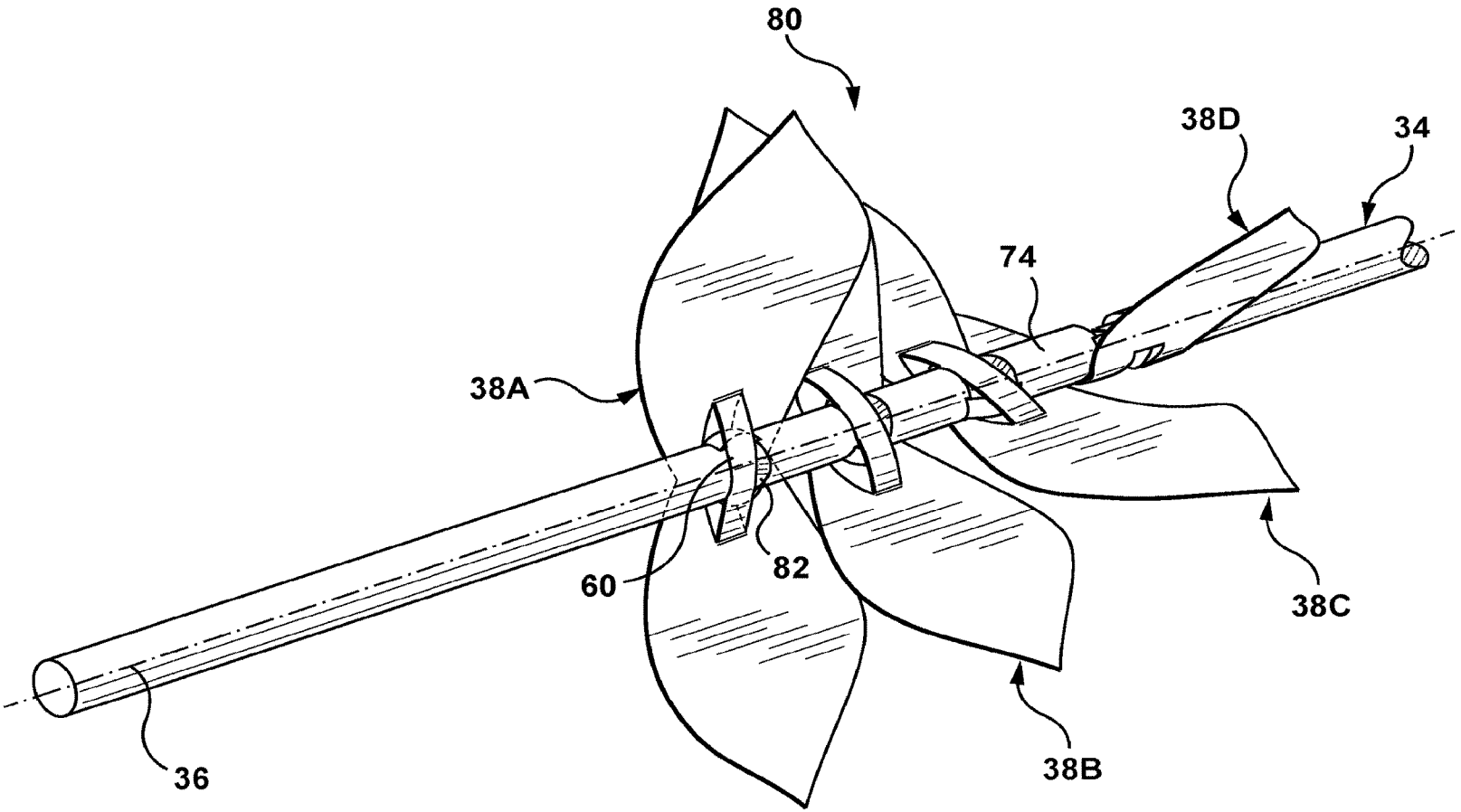
FIG. 2B is an isometric view of a portion of the flicker element of the invention.

As can be seen in FIGS. 2A, 2B, and 3D, once the paddle element 38 is mounted on the detent 76, the inner connector 60 preferably engages the region 82 of the selected detent, and the center region 70 of the inner connector 60 tends to be somewhat flattened as a result. The center region 70 of the inner connector 60 accordingly positions the paddle element 38 in a predetermined radial position, determined by the radial position of the region 82. As noted above, it is preferred that the predetermined radial position of the paddle element 38 is in relation to the paddle element(s) adjacent thereto, i.e., the body portions 40 of adjacent paddle elements are located at approximately 45° relative to each other.

Preferably, the light passing through the aperture 50 to the screen 24 is shaped by the aperture 50. As can be seen in FIGS. 1A and 1B, the apertures 50 preferably are shaped to provide images of flames 26 (FIG. 1E) viewable by the observer 88 positioned to view the front surface 90 of the screen 24 (FIG. 1C). In particular, it will be understood that each of the light sources 22 and each of the paddle element groups 80 are positioned to direct the light from the light sources 22 through a selected aperture 50 to form the flame image 26. Although the images 26 may to an extent overlap at their lower ends so as to simulate a real fire, the respective images 26 are for the most part formed only by the respective apertures therefore, and the light sources 22 and the paddle element groups 80 respectively associated with such apertures 50.

For instance, the light from the light source(s) 22 that is directed to the flicker element 32 is schematically represented by arrow "M" in FIG. 1C. The light that is reflected by the paddle elements 38 toward the aperture 50 is schematically represented by arrow "N" in FIG. 1C.

For convenience, the paddle elements illustrated in FIG. 2B are identified by reference numerals 38A-38D. It will be understood that the respective positions of the paddle elements 38A-38D preferably are determined by the planar region 82 of each detent 76 on which they are respectively mounted.

As can be seen in FIGS. 3B and 3E, it is preferred that the central region 44 of each of the body portions 40A, 40B of the paddle element 38 is generally convex on the first side 54 thereof (FIG. 3B) and generally concave on the second side 56 thereof (FIG. 3E). For clarity of illustration, the convex central regions 44 are identified by reference letter "J" in FIG. 3B, and the concave central regions 52 are identified by reference letter "K" in FIG. 3E. Due to the convex and concave regions, the body portions 40A, 40B are formed to have generally cupped shapes, i.e., they are non-planar, once the paddle element 38 is mounted on the rod 34.

It will be understood that the extent of the convexity and concavity of the central regions 44 is somewhat exaggerated in FIGS. 3B and 3E and 5A-5D. Also, the convexity and concavity of the central regions 44 is not shown in FIGS. 2A, 2B, 3C, and 3D for clarity of illustration.

In use, as described below, the light forming the images 26 generally appears to vary in intensity within the images 26. This variation in intensity enhances the realistic effect provided by the assembly 20, as such variation is similar to variations in light intensity observable in flames in a real wood or coal fire, or a fire consuming other combustible materials. It is believed that the variation in light intensity within the image 26 is due, at least in part, to the cupped shapes of the body portions 40A, 40B. Part of the light reflected from a body portion 40 is reflected from the (substantially planar) perimeter regions 46, and another part of the light reflected from such body portion 40 is reflected from the convex or concave region "J" or "K", as the case may be. It will be understood that, as the flicker element 32 is rotated, the intensity of the light reflected by each body portion 40 and directed to the screen 24 to form the image of flames varies. This is thought to be because the light from the light source is directed to the moving (i.e., rotating) body portion, causing the light to be reflected, at least in part, sequentially from the substantially planar region and the non-planar central region.

Figure 5A:
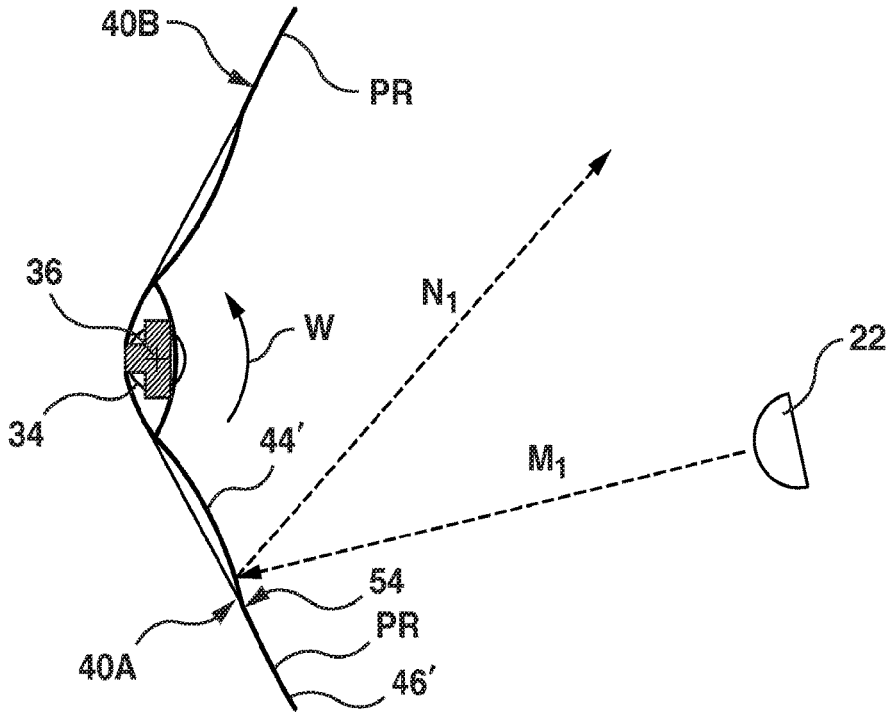
FIG. 5A is a cross-section of a single paddle element mounted on the rod in a first position, drawn at a smaller scale.

As can be seen in FIG. 5A, on the first side 54 of the body portion 40A, the central region 44' is somewhat convex. When the paddle element 38 is in the position shown in FIG. 5A, the light from the light source is at least partially directed to the slightly convex central region 44', and is reflected from the central region 44' toward the aperture (not shown in FIG. 5A). It will be understood that light is also reflected from the perimeter region 46' that is transversely proximal to the central region 44', however, such reflected light is omitted for clarity of illustration. The light from the light source is schematically represented by the arrow "$M_1$", and the light reflected from the central region 44'is schematically represented by the arrow "$N_1$". It will also be understood that the reflected light "$N_1$" is directed through the aperture 50 to the screen 24 (not shown in FIGS. 5A-5D).

Figure 5B:
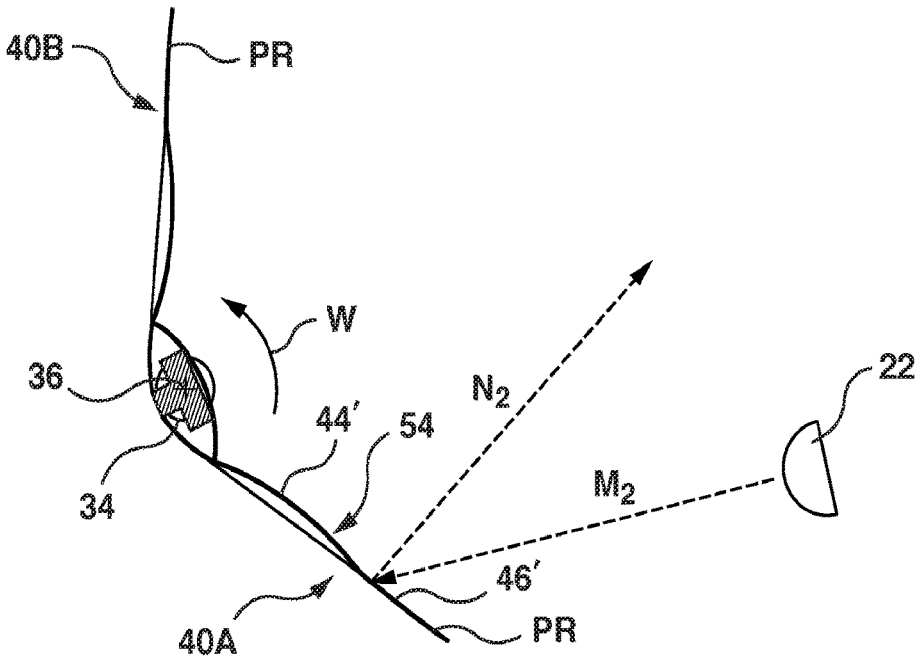
FIG. 5B is a cross-section of the paddle element and the rod of FIG. 5A, rotated to a second position.

In FIG. 5B, the rod has rotated in the direction indicated by arrow "W" so that the paddle element is in a different position relative to the light source 22. In this position, the light is reflected off the substantially planar perimeter region 46'. The light from the light source is schematically represented by the arrow "$M_2$", and the reflected light is schematically represented by the arrow "$N_2$". Because the light is reflected from the substantially planar surface 46', rather than the convex surface 44', the light reflected from the perimeter region 46' as projected onto the screen 24 would have a slightly different intensity than the light reflected from the central region 44'.

Figure 5C:
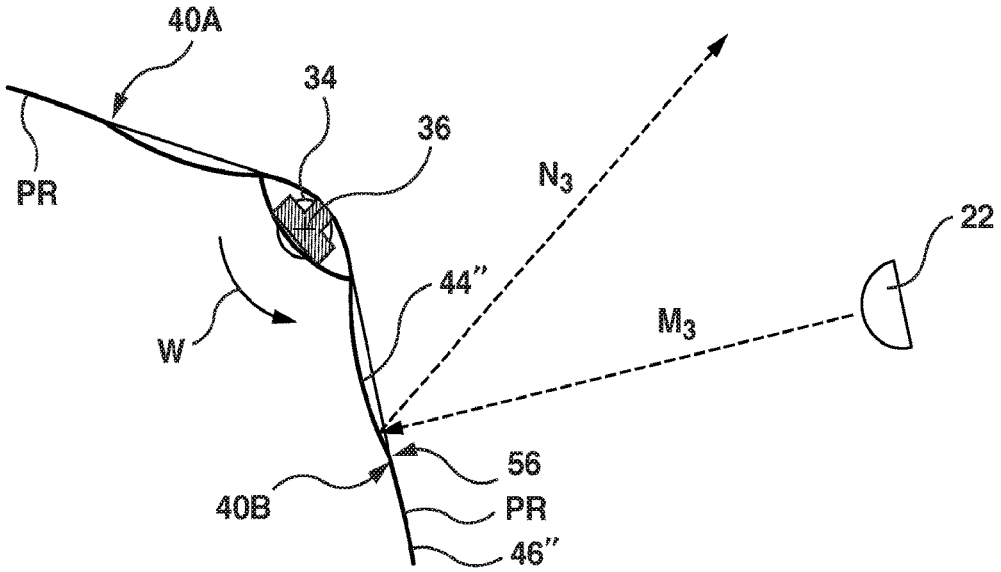
FIG. 5C is a cross-section of the paddle element and the rod of FIG. 5B, rotated to a third position.

In FIG. 5C, the paddle element 38 is shown after it has been rotated further in the direction indicated by the arrow "W", the second side 56 of the body portion 40B is exposed to the light from the light source 22. In this position, light is at least partially reflected from the central region 44", the light being represented by the arrows "$M_3$" and "$N_3$". The central region 44" on the second side 56 is concave. It will be understood that light is also reflected, at this point, from the perimeter region 46", however, such reflected light is omitted for clarity of illustration.

Figure 5D:
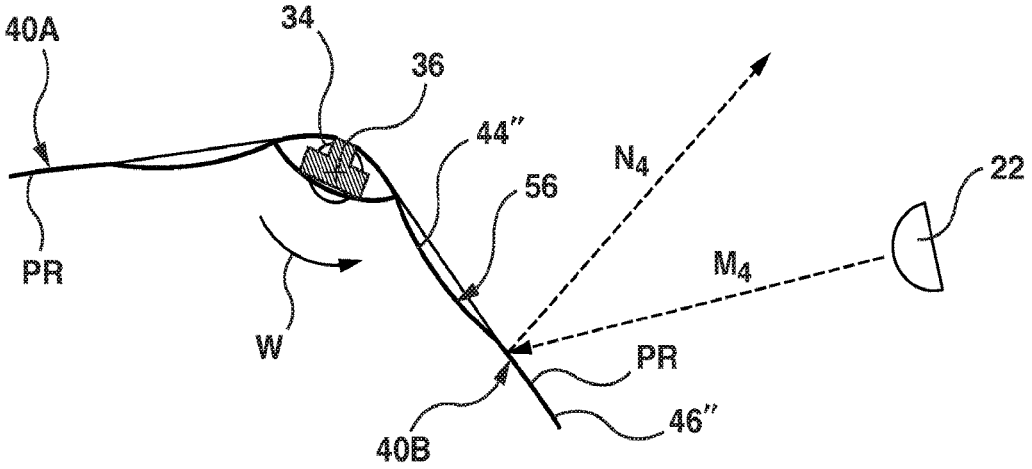
FIG. 5D is a cross-section of the paddle element and the rod of FIG. 5C, rotated to a fourth position.

In FIG. 5D, the paddle element 38 is shown as having been rotated further in the direction indicated by the arrow "W" (relative to the position thereof illustrated in FIG. SC), so that the light from the light source 22 is at least partially reflected from the substantially planar perimeter region 46". The light reflected from the perimeter region 46" is schematically represented by the arrow "$N_4$". In this situation also, because the light is reflected from the substantially planar surface 46", rather than the concave surface 44", the light reflected from the perimeter region 46" as projected onto the screen 24 would have a slightly different intensity than the light reflected from the central region 44".

It will also be understood that, as described above, the flicker element preferably includes a number of paddle elements positioned proximal to each other, in the paddle element group. The other paddle elements on the rod are omitted from FIGS. 5A-5D for clarity of illustration.

As noted above, the paddle elements 38 preferably are mounted on the rod 34 to form the paddle element groups 80, which are associated with the respective apertures 50. It is believed that the radial positioning of the paddle elements 38 in each group 80, to an extent, also causes the realistic variation in light intensity in the image 26 due to the different reflective surfaces of the body portions 40A, 40B being used to reflect the light from the light source(s) 22 in turn as the flicker element 32 is rotated about the rod's axis 36.

Figure 6A:
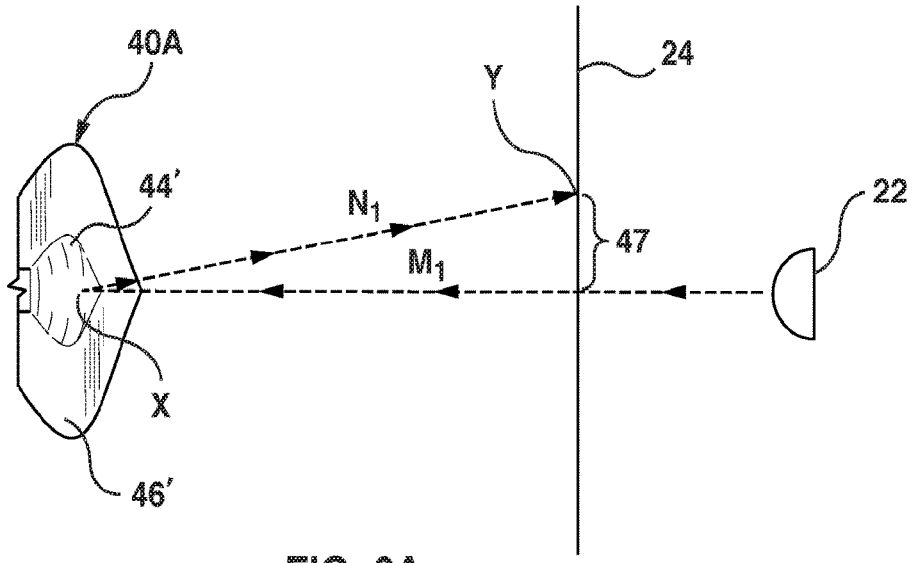
FIG. 6A is a top view of a portion of the paddle element positioned as shown in FIG. 5A and certain other elements of the flame simulating assembly.

For example, in FIG. 6A, a top view of the situation illustrated in FIG. 5A is provided. The light from the light source 22 is represented by the arrow "$M_1$", and it is reflected from the central region 44'. The light reflected from the central region 44' toward the screen 24 is represented by the arrow "$N_1$". For clarity of illustration, the point on the central region 44' at which the light from the light source 22 is reflected toward the screen 24 is identified as "X". As can be seen in FIG. 6A, the light that is reflected from the central region 44' produces an image of flames, or part thereof, at a point identified as "Y" on the screen.

Figure 6B:
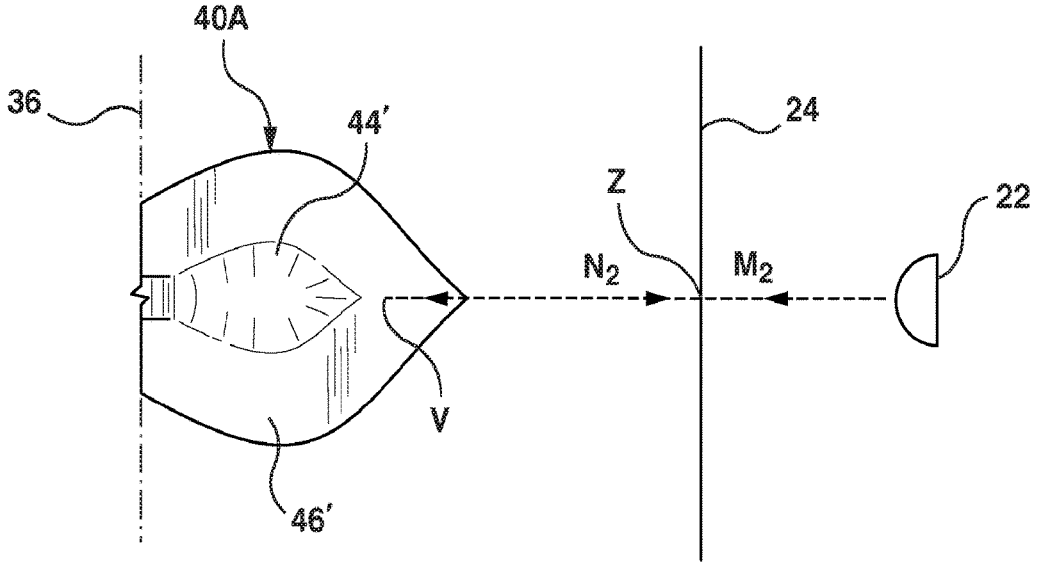
FIG. 6B is a top view of the portion of the paddle element positioned as shown in FIG. 5B and certain other elements of the flame simulating assembly.

In FIG. 6B, a top view of the situation illustrated in FIG. 5B is provided. The light from the light source 22 is represented by the arrow "$M_2$" and the light reflected from the perimeter region 46' is schematically represented by the arrow "$N_2$". The light is shown as being reflected from a point "V" on the perimeter region 46'. As illustrated in FIG. 6B, the light that is reflected from the perimeter region 46' is directed substantially orthogonally to the axis 36 of the rod 34, and intersects the screen at a point identified for clarity of illustration as "Z".

From FIGS. 6A and 6B, it can be seen that the different shapes of the central region 44 (i.e., non-planar) and the perimeter region 46 (i.e., substantially planar) result in the light from the light source 22 being reflected in slightly different directions toward the screen 24 as the rod 34 rotates. For clarity of illustration, the extent to which the locations "Y" and "Z" are different is exaggerated. It will be understood that a number of elements of the flame simulating assembly 20 are omitted from FIGS. 6A and 6B, also for clarity of illustration. It will also be understood that the light reflected from the other central region 44", as illustrated in FIG. 5C, is also directed to a location on the screen that is other than the location on the screen to which the light reflected from the perimeter region 46" is directed.

Another benefit that is believed to result from the arrangement of the elements of the assembly 20 is the virtual elimination of incidental partially transverse flashes of light on the screen 24. This benefit is believed to be due to the generally consistent positioning of the paddle elements 38 relative to the screen 24, i.e., because the paddle elements 38 are positioned by the respective detents 76 in the respective predetermined positions therefor. As described above, and as illustrated in FIG. 1C, the rod 34 preferably is positioned so that its axis 36 is substantially parallel to the screen 24. The light from the light source is directed toward the body portions 40A, 40B in a direction that is substantially orthogonal to the axis, and aligned with the aperture therefor. It is believed that the elimination of the incidental partially transverse flashes of light is due to this arrangement, and the manner in which each paddle element is secured in position on each detent respectively.

As can be seen, for instance, in FIG. 1C, the flame simulating assembly 20 preferably also includes a simulated fuel bed 92. Those skilled in the art would appreciate that the simulated fuel bed 92 may be formed in any suitable manner, and made of any suitable materials. In one embodiment, the simulated fuel bed 92 preferably includes one or more simulated fuel elements 94 supported by a platform 96.

Those skilled in the art would also appreciate that the elements 94 may be made of any suitable material(s). The simulated fuel elements 94 preferably are at least partially light-transmitting. Preferably, the simulated fuel elements 94 are at least partially translucent, and/or at least partially transparent. In one embodiment, it is preferred that the elements 94 are, for example, pieces of cut glass. Alternatively, the fuel elements 94 may be made of acrylic. The fuel elements 94 preferably are formed into any suitable shape(s). In one embodiment, the fuel elements 94 preferably are formed to be multi-faceted. The fuel elements 94 preferably are located by a support element 96 that positions at least some of the fuel elements 94 adjacent to the screen 24.

Figure 1D:
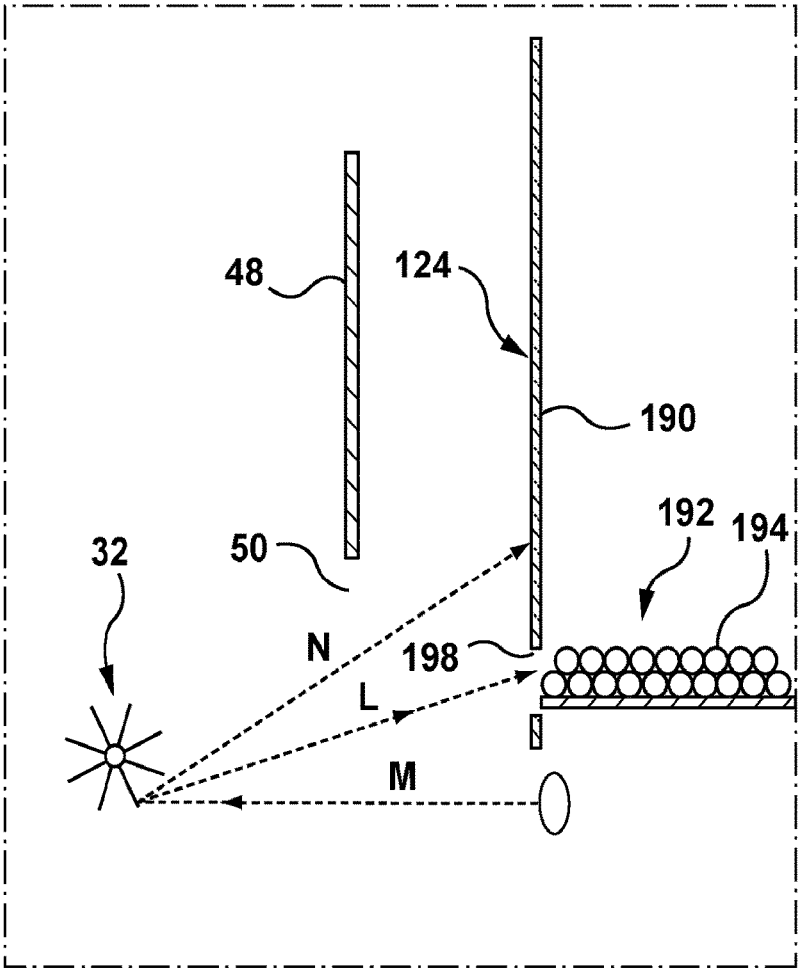
FIG. 1D is a cross-section of an alternative embodiment of the flame simulating assembly of the invention.
Figure 1E:
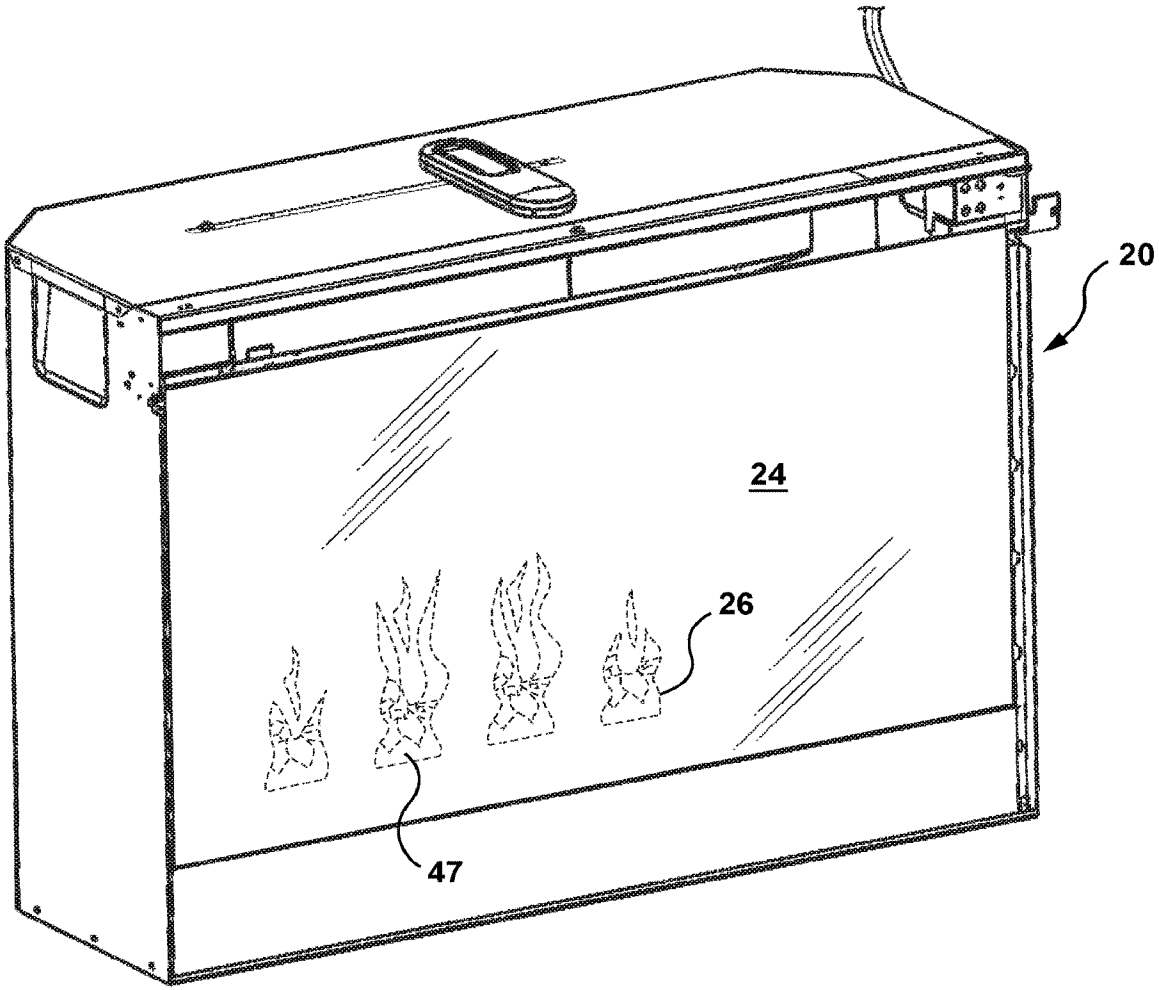
FIG. 1E is an isometric view of the front side of the flame simulating assembly of the invention including a screen.

In an alternative embodiment, a flame simulating assembly 120 of the invention preferably includes a screen 124 and a simulated fuel bed 192 located in front of a screen 124 thereof (FIG. 1D). The simulated fuel bed 192 includes a number of simulated fuel elements 194, e.g., pieces of cut glass. As can be seen in FIG. 1D, the screen 124 preferably defines a gap 198 therein.

As can also be seen in FIG. 1D, in this embodiment, the light from the light source 124 preferably is reflected from the flicker element 32 through the gap 198, as schematically represented by arrow "L" in FIG. 1D. It has been found that light directed through the gap 198 enhances the overall simulation effect. Such light illuminates or enters the simulated fuel elements 194 in the region immediately in front of the screen 124. This causes the simulated fuel elements 194 that are proximal to the front surface 190 of the screen 124 to appear to be illuminated from within by a flickering light, e.g., as if by a real fire.

The invention also includes a method of providing images of flames that includes the following. The light sources 22 for producing light, the screen 24, and the rotatable flicker element 32 including the rod 34 defined by the axis 36 thereof and a number of the paddle elements 38 mounted in respective preselected positions on the rod, are provided, as described above. As noted above, in one embodiment, each paddle element 38 includes one or more body portions with one or more reflective surfaces 42 thereon, and the reflective surfaces preferably are formed to include the substantially planar region 46 substantially defining the perimeter plane "PR" and the non-planar region 44. The paddle elements are located to position the perimeter planes "PR" thereof substantially parallel to the axis 36. The screen 24 is provided for displaying a number of images of flames 26 thereon. The rod is located so that the axis thereof is substantially parallel to the screen, to locate the reflective surfaces intermittently in the path of the light from the light source 22, for reflecting the light from the light source to the screen as the flicker element rotates relative to the screen. The flicker element is rotated about the axis. When the flicker element is rotating, the light from the light source is directed to the reflective surface intermittently, to intermittently provide a first reflected light reflected from the planar region and a second reflected light reflected from the non-planar region to the screen to provide the images of flames. The images 26 include respective portions thereof formed by the first reflected light and the second reflected light respectively, the first reflected light having a different intensity on the screen relative to the second reflected light. It will be understood that, in the foregoing description, the references to "first reflected light" and "second reflected light" are intended only to distinguish the light reflected from the planar region from the light that is reflected from the non-planar region. Those skilled in the art would appreciate that the light may be reflected simultaneously, or virtually simultaneously, from these regions.

The fluctuations in the reflected light are, in part, the result of the differences in the regions of the reflective surfaces 42, as illustrated schematically in FIGS. 5A-5D, and as described above. In addition, the light that is reflected from the flicker element fluctuates in intensity because of the gaps between the paddle elements, i.e., each paddle element reflects the light only intermittently as the flicker element rotates.

It is also preferred that the invention provides a method of forming the flicker element. The elongate rod is provided, with the detents formed on the rod. Each detent includes one or more of the substantially planar surfaces. The paddle elements are provided, and each paddle element is bent at the bridge portion thereof to define the space 72 between the inner connector and the pair of outer connectors thereof. The rod is inserted into the space 72 to locate the planar surface of the detent 76 for engagement with the inner connector. The inner connector is released to permit resilient pivoting movement of the body portions about the bridge portion, to urge the inner connector against the planar region for positioning the paddle element in the preselected position therefor on the rod.

Figure 7A:
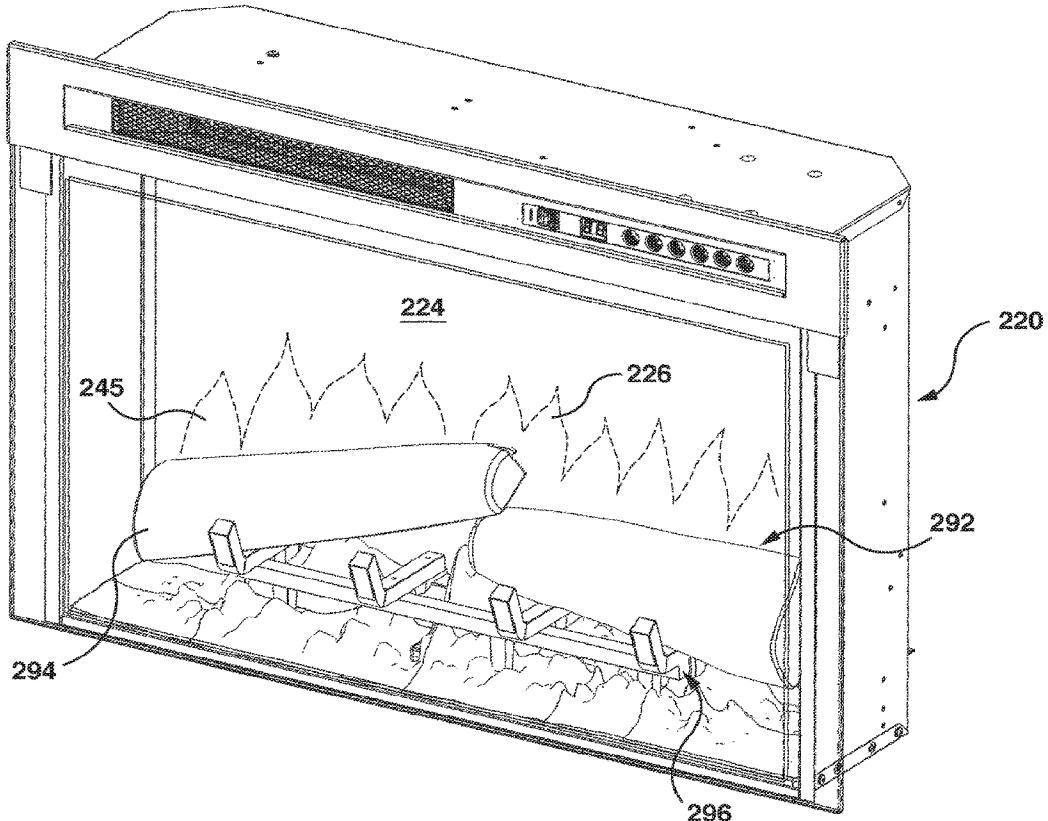
FIG. 7A is an isometric view of an alternative embodiment of the flame simulating assembly of the invention, drawn at a smaller scale.
Figure 7B:
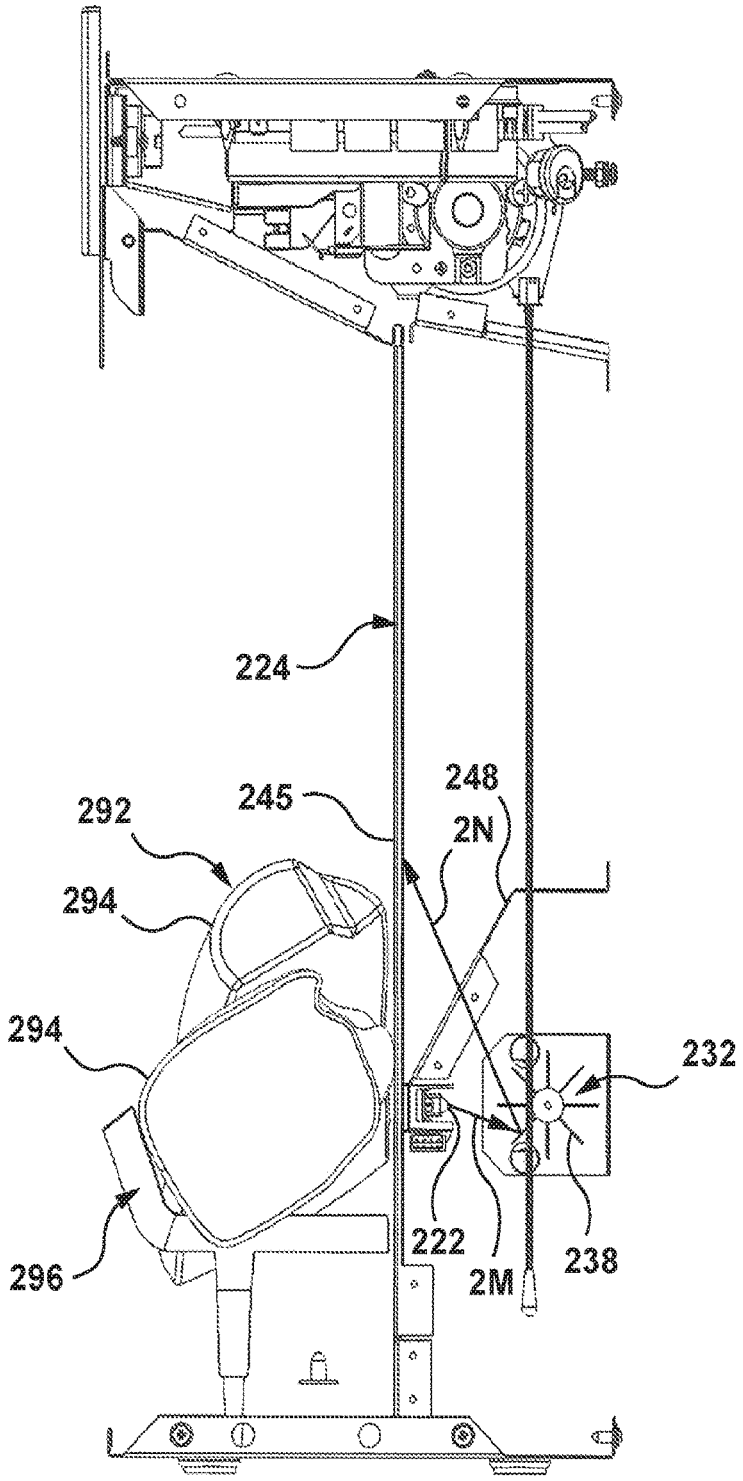
FIG. 7B is a side view, partially cut away, of the flame simulating assembly of FIG. 7A.
Figure 7C:
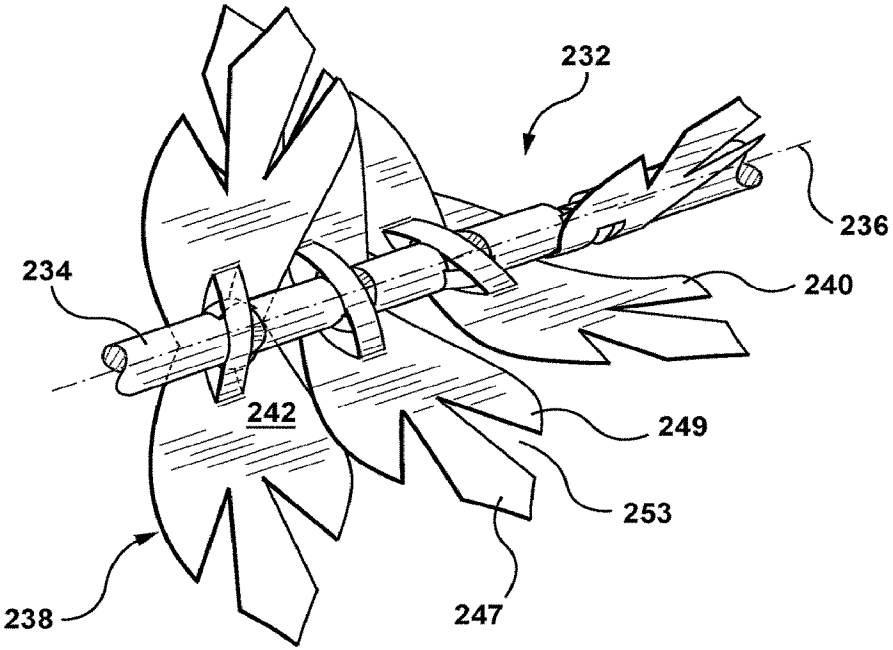
FIG. 7C is an isometric view of a portion of an alternative embodiment of the flicker element of the invention, drawn at a larger scale.

Alternative embodiments of the invention are illustrated in FIGS. 7A-10B. In one embodiment, the flame simulating assembly 220 of the invention preferably includes one or more light sources 222 (FIG. 7B) for producing light, a screen 224 to which the light from the light source 222 is directed, to provide a plurality of images 226 of flickering flames thereon (FIG. 7A), and a rotatable flicker element 232 (FIG. 7C). It is preferred that the flicker element 232 includes an elongate rod 234 defined by an axis 236 thereof about which the rod 234 is rotatable, and a number of paddle elements 238 located in respective predetermined locations on the rod 234 (FIG. 7C). As will be described, each of the paddle elements 238 preferably includes one or more body portions 240 having one or more reflective surfaces 242 thereon. Preferably, and as shown in FIG. 8B, the reflective surface 242 includes a central region 244 and a perimeter region 246 at least partially located around the central region 244, the perimeter region 246 at least partially defining a perimeter plane "2PR". It is also preferred that the paddle elements 238 are located in the respective predetermined locations therefor to position the perimeter plane "2PR" substantially perpendicular to the axis 236, for intermittently reflecting the light from the light source 222 from the reflective surface 242 to predetermined regions 245 on the screen 224 respectively (FIGS. 7A, 7B) as the flicker element 232 rotates about the axis 236, to provide the images of flickering flames on the screen 224. Preferably, because the central region 244 is substantially non-planar and the perimeter region is at least partially planar, the light reflected therefrom to the screen 224 as the flicker element 232 rotates has varying intensity at the respective predetermined regions on the screen 224. As will also be described, it is also preferred that the perimeter region 246 includes one or more middle parts 247 and one or more side parts 249 (FIG. 7C). As shown in FIG. 7, the middle part 247 preferably is at least partially defined by one or more channels 253 partially separating the middle part 247 and the side part(s) 249.

As will also be described, the middle part and the side part(s) preferably are formed to reflect the light from the light source so as to provide a realistic flame effect. It will be understood that the middle part and the side part(s) as illustrated are exemplary, and that they may have any suitable configuration.

Figure 8A:
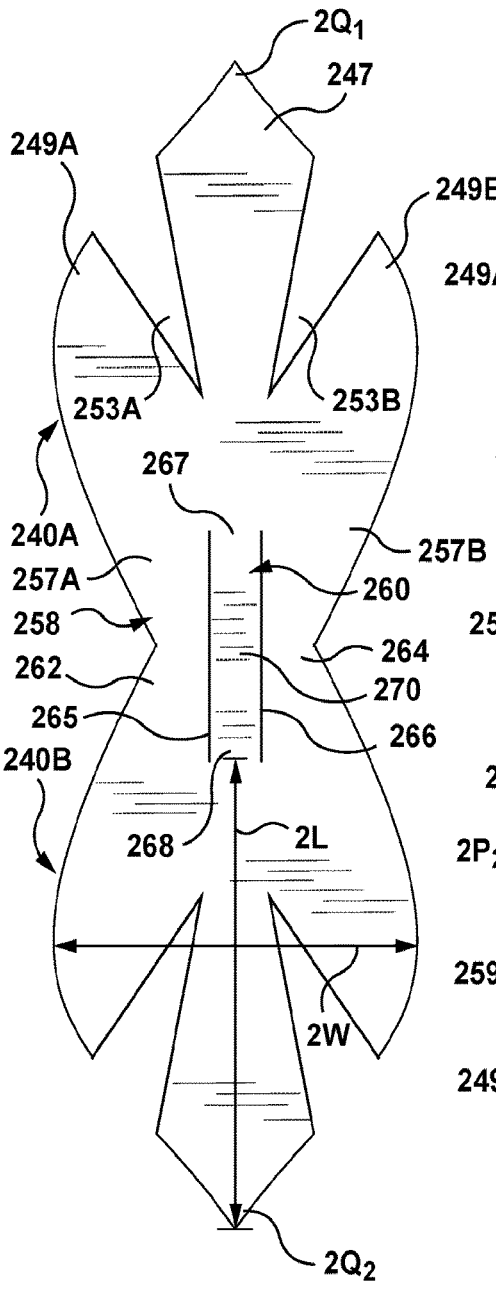
FIG. 8A is a top view of an alternative embodiment of a paddle element of the invention, drawn at a larger scale.

In one embodiment, the side parts preferably include a first side part 249A and a second side part 249B (FIG. 8A). Also, the one or more channels preferably include first and second channels 253A, 253B (FIG. 8A). In the embodiment illustrated, e.g., in FIG. 8A, the middle part 247 is at least partially defined by the first and second channels 253A, 253B, the first channel 253A being located between the middle part 247 and the first side part 249A, and the second channel 253B being located between the middle part 247 and the second side part 249B.

Figure 8B:
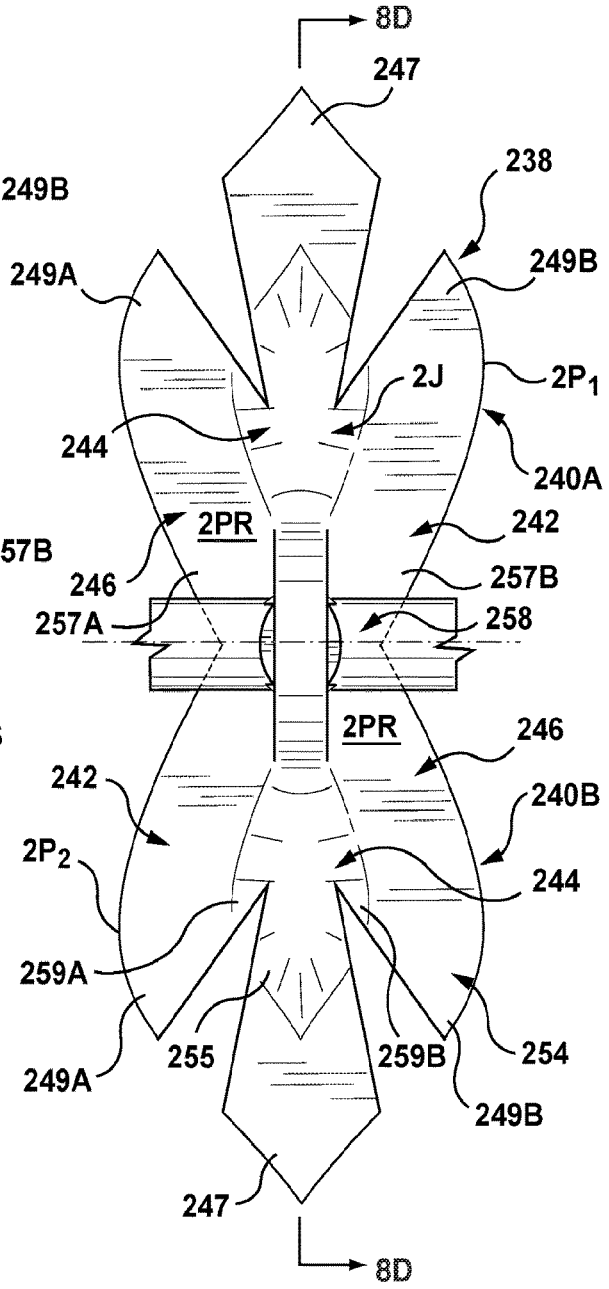
FIG. 8B is a top view of the paddle element of FIG. 8A when the paddle element is mounted on a rod in the flicker element of FIG. 7C.

Preferably, the perimeter region 246 includes base regions 257A, 257B that are adjacent to the side parts 249A, 249B respectively (FIGS. 8A, 8B).

In the embodiments illustrated in FIGS. 7A-10B, it is preferred that the paddle elements 238 are mounted on the rod 234 so as to be substantially equally spaced apart from each other, as will be described.

Preferably, when mounted on the rod, the respective body portions 240 of the paddle elements 238 are positioned substantially at 45° radially relative to the respective body portions 240 of the paddle elements 238 that are positioned on the rod 234 adjacent thereto, for reflection of the light from the light source 222 toward the predetermined regions on the screen 224 when the rod 234 is rotated.

It will be understood that the body portions 240 of the paddle elements 238 may be positioned radially relative to each other in any desired relationship. As will be described, the rod 234 preferably includes a rod body 274 coaxial with the axis 236 and a number of mounting elements 276 located at predetermined positions along the rod body 274. Preferably, the mounting elements are located on the rod body for positioning the paddle elements in the respective predetermined locations therefor.

It is also preferred that the mounting elements are spaced substantially equidistant apart from each other along the rod body.

The rate of rotation of the flicker element 232 preferably is taken into account when determining the arrangement of the paddle elements relative to each other along the rod 234.

Preferably, and as can be seen in FIGS. 8A-8E, the body portion 240 includes a first side 254 and an opposed second side 256 thereof, and at least a selected one of the first and second sides 254, 256 includes the reflective surface 242. It is preferred that each of the first and second sides 254, 256 includes reflective surfaces. For clarity of illustration, in FIGS. 9A-9D, the central region and the perimeter region on the first side 254 are identified by reference numerals 244' and 246' respectively, and the central region and the perimeter region on the second side 256 are identified by reference numerals 244" and 246" respectively. In one embodiment, the central region 244' on the first side 254 preferably is at least partially convex relative to the perimeter region 246' on the first side 254, and the central region 244" on the second side 256 is at least partially concave relative to the perimeter region 246" on the second side 256. For clarity of illustration, the convex central region 244 is identified by the reference numeral "2J" in FIG. 8B, and the concave central region is identified by the reference numeral "2K" in FIG. 8E. It will be understood that the convex central region "2J" is convex relative to the perimeter plane "2PR". Similarly, it will be understood that the concave central region "2K" is concave relative to the perimeter plane "2PR".

As can also be seen in FIGS. 8A-8E, in one embodiment, each of the paddle elements 238 preferably includes two body portions (identified by reference numerals 240A, 240B for convenience) connected by a bridge portion 258. Preferably, the bridge portion 258 includes an inner connector 260 and a pair of outer connectors 262, 264 generally located on opposite sides of the inner connector 260 (FIG. 8A). As can be seen in FIG. 8B, the body portions 240A, 240B preferably are at least partially defined by respective perimeters "$2P_1$", "$2P_2$". It is preferred that the outlines of the body portions 240A, 240B (i.e., as defined by the perimeters "$2P_1$", "$2P_2$") are substantially the same, i.e., they are mirror images of each other.

The base regions 257A, 257B of the perimeter region 249 preferably extend to the bridge portion 258 (FIGS. 8A, 8B). As will be described, when the paddle element 238 is mounted on the rod 234, the base regions 257A, 257B tend to define the perimeter plane "2PR". Other parts of the perimeter region 246 may be bent so that they are not in the perimeter plane "2PR".

When the paddle elements 238 are mounted on the rod 234, the paddle elements 238 preferably are subjected to tension as a result, and this causes the paddle elements 238 to be formed so that they have the central regions 244 that are bent or curved, to provide the non-planar regions. However, the base regions 257A, 257B, which are located adjacent to the bridge portion 258, preferably remain at least partially substantially planar after the paddle element 238 thereof is subjected to tension when mounted on the rod 234, as aforesaid.

As will be described, the differences between the central region 244 and the perimeter region 246 result in differences in the light from the light source that is reflected from these two different regions of the reflective surface 242 to the screen 224. Similarly, differences among the middle part 247, the side parts 249A, 249B, the central region 244, and the base regions 257A, 257B result in differences in the light from the light source that is reflected therefrom to the screen 224. These differences have been found to provide a realistic flame effect on the screen 224, which simulates the flames of a fire.

Those skilled in the art would appreciate that the paddle elements 238 may be formed of any suitable materials, and that the central region 244, and the perimeter region 246, may be formed in any suitable way. It is preferred that the paddle elements 238 include, or are made of, material that is highly reflective, i.e., adapted for specular reflection. As will also be described, it is also preferred that the paddle element 238 is made of material that is resilient and flexible. Those skilled in the art would be aware of suitable materials: For example, it has been found that the paddle elements 238 may be made of reflective Mylar®, preferably from sheets that are approximately 7 mil (0.007 inch, or approximately 0.1778 mm) thick.

In one embodiment, the paddle element 238 preferably is formed by cutting the paddle element 238 out of a sheet of suitably flexible material, e.g., reflective Mylar®. Also, it is preferred that the outer connectors 262, 264 and the inner connector 260 are at least partially defined by cuts 265, 266 that partially separate the outer connectors 262, 264 from the inner connector 260 respectively (FIG. 8A).

It is also preferred that the channels 253A, 253B are formed by cutting material out of the sheet of suitable material. Those skilled in the art would appreciate that the channels 253A, 253B may be cut after the basic outline of the body portions 240A, 240B has been formed.

Alternatively, the paddle elements 238 and/or the features thereof may be formed using any other suitable methods and materials, as would be appreciated by those skilled in the art. For example, the paddle elements and/or the body portions thereof may be formed using injection molding.

It will be understood that the body portions 240A, 240B and the bridge portion 258 may have any suitable size, shape or form. In one embodiment, and as can be seen in FIG. 8A, the body portions 240A, 240B preferably each have generally rounded sides and pointed or peaked tips or outer ends "$2Q_1$", "$2Q_2$", interrupted by the channels 253A, 253B. The paddle element 238 preferably narrows at the bridge portion 258. Those skilled in the art would appreciate that the paddle element preferably is relatively small. For example, the body portion's width "2W" from side to side may be a maximum of about 0.625 inch (approximately 1.59 cm), and the length "2L" from the central connector 256 to the outer end may be a maximum of about 0.75 inch (approximately 1.91 cm) (FIG. 8A). In one embodiment, each of the body portions 240A, 240B preferably are approximately the same size and shape.

It is also preferred that the inner connector 260 is integrally formed with the body portions 240A, 240B. The outer connectors 262, 264 preferably are also integrally formed with the body portions 240A, 240B. In each paddle element 238, the inner connector 260 and the outer connectors 262, 264 preferably are separated only by the respective cuts 265, 266 therebetween, in the bridge portion 258 (FIG. 8A).

Figure 8C:
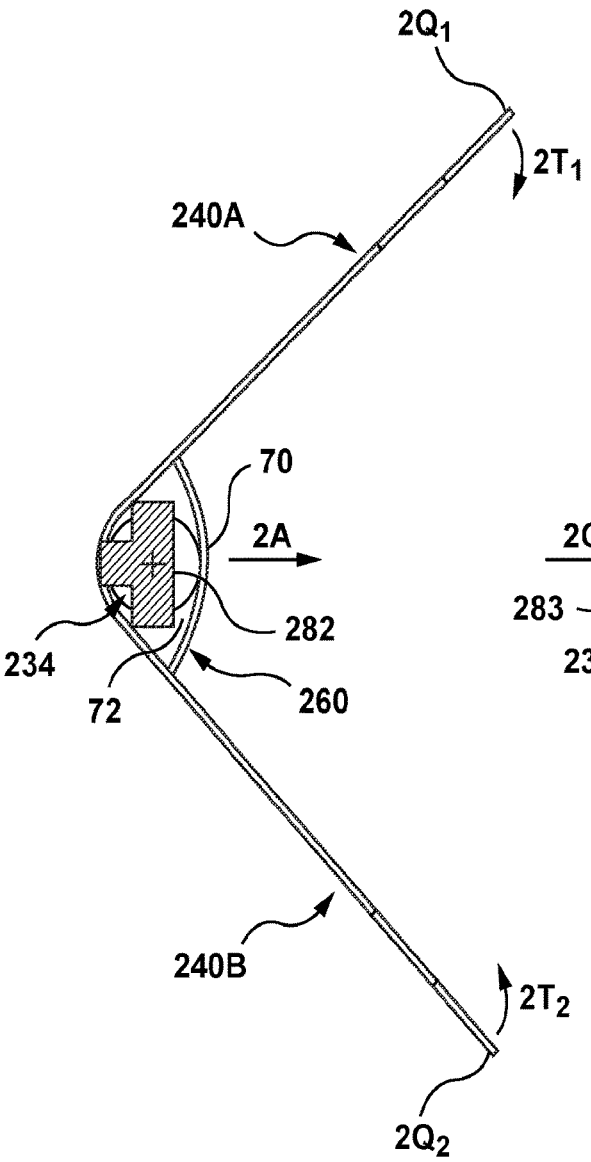
FIG. 8C is a side view of the paddle element and the rod of FIG. 8B, before the paddle element is mounted on the rod.

As can be seen in FIG. 8A, the inner connector 260 preferably extends between its first and second ends 267, 268, where the inner connector 260 is integrally joined with the respective body portions 240A, 240B. Because of the cuts 265, 266, the inner connector's central portion 270 may be moved outwardly, i.e., away from the outer connectors 262, 264 (FIG. 8A). Such outward movement would be, for example, generally in the direction schematically indicated in FIG. 8C by arrow "2A". As can be seen in FIG. 8C, when the central portion 270 is moved outwardly from the outer connectors 262, 264, an opening or space 272 is defined between the central portion 270 and the inner connectors 262, 264.

Preferably, the paddle element is mounted on the rod as follows. When the paddle element 238 is to be mounted on the rod 234, the paddle element 238 is first compressed, or bent. The tips "$2Q_1$", "$2Q_2$" of the respective body portions 240A, 240B are moved toward each other. This causes the body portions 240A, 240B to pivot toward each other, as indicated by arrows "$2T_1$", "$2T_2$". As noted above, at the same time, the central portion 270 is moved or bent outwardly, to define the opening 272. The rod 234 is positioned in the opening 272, and while the paddle element 238 is compressed (so as to hold the opening 272 open), the paddle element 238 and/or the rod 234 is/are moved relative to each other until the paddle element 238 is positioned at a selected one of the mounting elements 276, to locate the paddle element 238 in a preselected position therefor on the rod 234, relative to the other paddle elements.

Figure 8D:
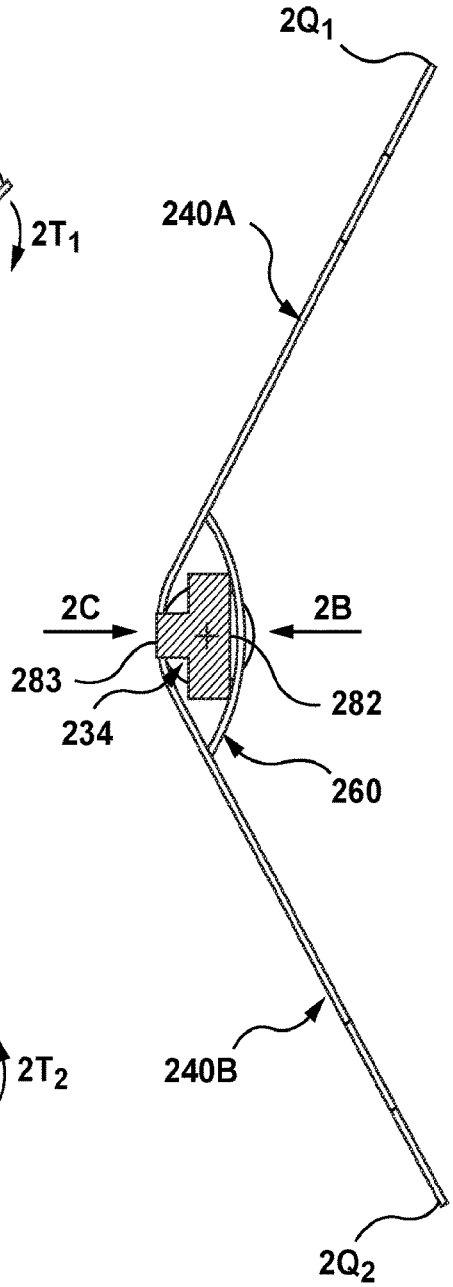
FIG. 8D is another side view of the paddle element and the rod of FIGS. 8B and 8C in which the paddle element is mounted on the rod.
Figure 8E:
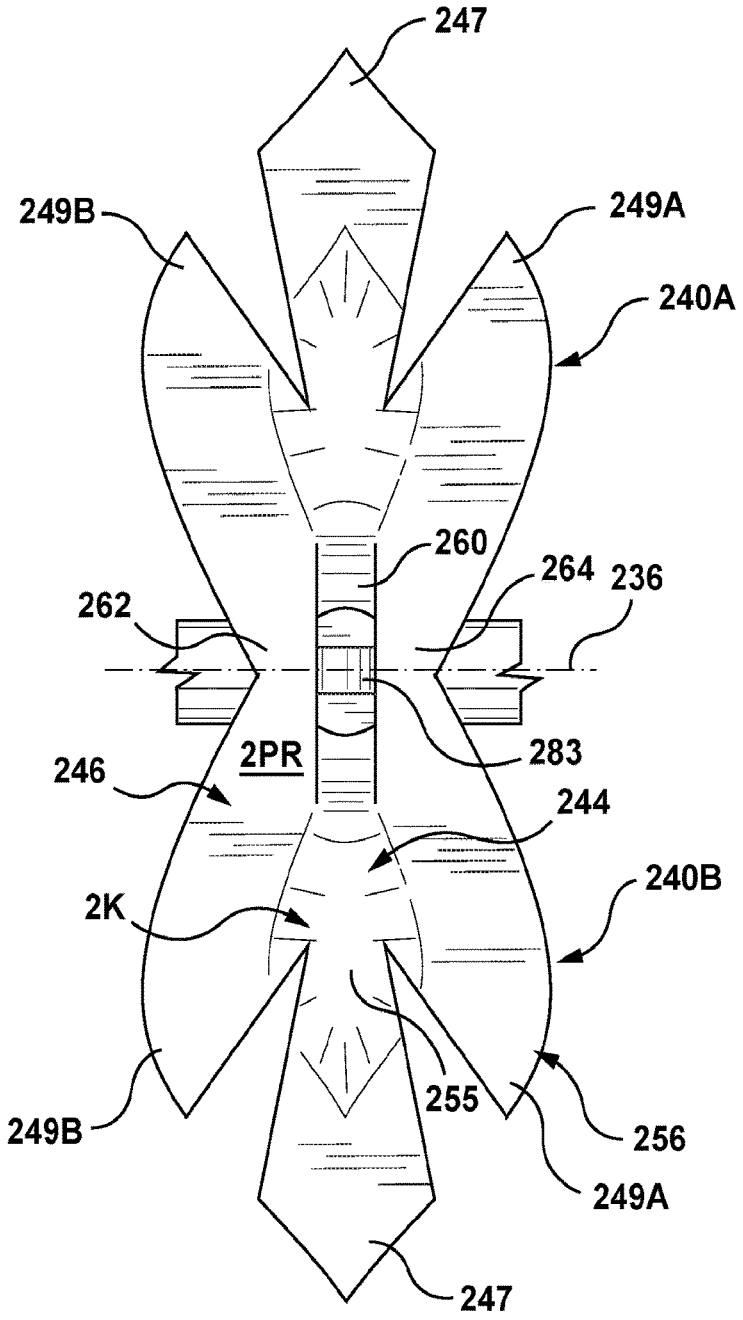
FIG. 8E is a back view of the paddle element and the rod of FIGS. 8B and 8D in which the paddle element is mounted on the rod.

When the paddle element 238 is located at its preselected position on the rod 234, the paddle element 238 preferably is released (i.e., the tips "$2Q_1$", "$2Q_2$" of the body portions 240A, 240B are allowed to move away from each other), and the central portion 270 is allowed to engage the mounting element 276. The inner connector 260 is allowed to move in the direction indicated by arrow "2B" in FIG. 8D. Also, and as can be seen in FIGS. 8A, 8B, and 8E, the outer connectors 262, 264 engage adjacent parts of the rod body 274, and are urged in the direction indicated by arrow "2C" in FIG. 8D, to locate the paddle element 238 in its preselected position. From the foregoing, it can be seen that, once the paddle element 238 is mounted on the rod 234 in the predetermined location therefor, the inner connector 260 is urged against one side of the rod 234, and the outer connectors 262, 264 are urged against the opposite side of the rod 234. In this way, the paddle element 238 is relatively securely held in its predetermined location on the rod 234, i.e., spaced apart from the paddle elements mounted adjacent thereto.

When the paddle element 238 is located in its preselected position, it is subjected to tension, and consequently the central region 244 is puckered, or curved or bent, to form the central regions 244. In turn, because the middle part 247 and the central region 244 are joined at a connector part 255, the middle part 247 may at this point become bent or raised relative to the side parts, due to the curvature of the central region 244 (FIG. 8B). As a result, the middle part 247 may be non-coplanar with the perimeter plane "2PR". In the same way, when the central regions 244 are formed, the side parts 249A, 249B may also be bent due to the connection of the side parts 249A, 249B with the central regions 244 at the connectors 259A, 259B respectively (FIG. 8B).

As noted above, the paddle element 238 may be cut out of a relatively thin sheet of flexible plastic with a suitable (reflective) finish. It will be understood that a suitable material is a flexible, resilient material, i.e., preferably a material capable of substantially elastic deformation, and very little plastic deformation. Accordingly, when the tips "$2Q_1$", "$2Q_2$" of the body portions are moved toward each other, to form the opening 272, the deformation of the paddle element 238 is substantially an elastic deformation. That is, due to the flexibility of the material and because the extent of deformation is limited (i.e., the tips are only moved together to a limited extent), the material is not substantially elastically deformed. Because of this, when the pressure urging the tips "$2Q_1$", "$2Q_2$" of the body portions together is released, the tips of the body portions are urged apart from each other, because the paddle element 238 has a tendency to resiliently return to its generally planar, original, configuration.

It will be understood that the middle part 247 and the two side parts 249A, 249B may be positioned relative to each other in various ways. When the paddle element 238 is mounted on the rod 234, the paddle element 238 is subjected to tension, and the tension may cause one or more of the middle part 247 and the side parts 249A, 249B to bend relative to each other, and/or relative to the base regions 257A, 257B. It will be understood that, due to the connection of the base regions 257A, 257B to the bridge portion 258, the base regions 257A, 257B remain relatively planar after the paddle element 238 has been mounted on the rod 234.

Accordingly, in at least a selected one of the paddle elements 238, the first and second side parts 249A, 249B are substantially coplanar relative to each other. As will be described, this can be seen, e.g., in FIGS. 9A-9D. Also, in at least a selected one of the paddle elements, the middle part 247 preferably is non-planar (FIGS. 8B, 8E). As will be described, the effect resulting from mounting the paddle element 238 on the rod 234 may include bending one or more of the middle part and the side parts so that one or more of them may be bent somewhat, i.e., they may not be planar after mounting. Also, due to the tensions to which the paddle element 238 is subjected, even if the middle part and one or more of the side parts are substantially planar, the middle part and/or the side parts may be located in non-coplanar locations relative to each other after mounting.

Based on the foregoing, those skilled in the art would appreciate that, in at least a selected one of the paddle elements, the middle part 247 preferably is non-coplanar with the side parts 249A, 249B.

Figure 9A:
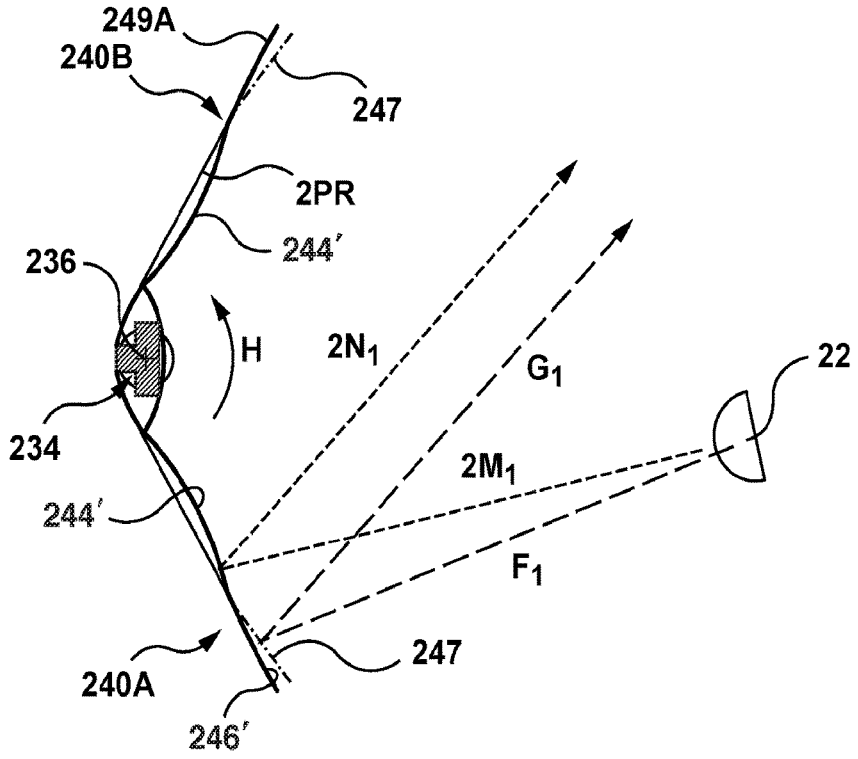
FIG. 9A is a cross-section of a single paddle element of FIG. 8B mounted on the rod and located in a first position, drawn at a smaller scale.
Figure 9B:
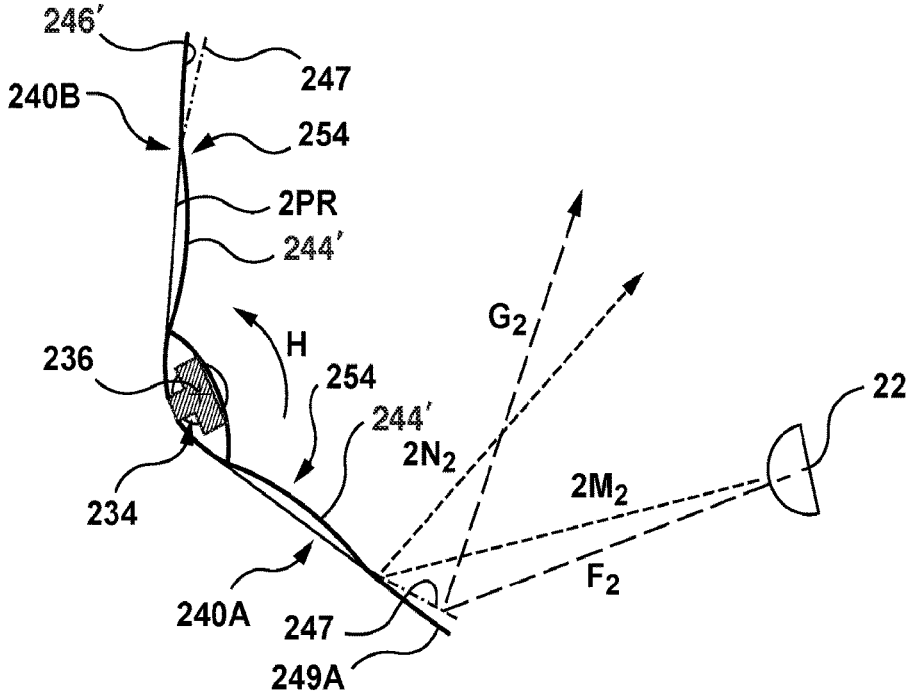
FIG. 9B is a cross-section of the paddle element and the rod of FIG. 9A, rotated to a second position.
Figure 9C:
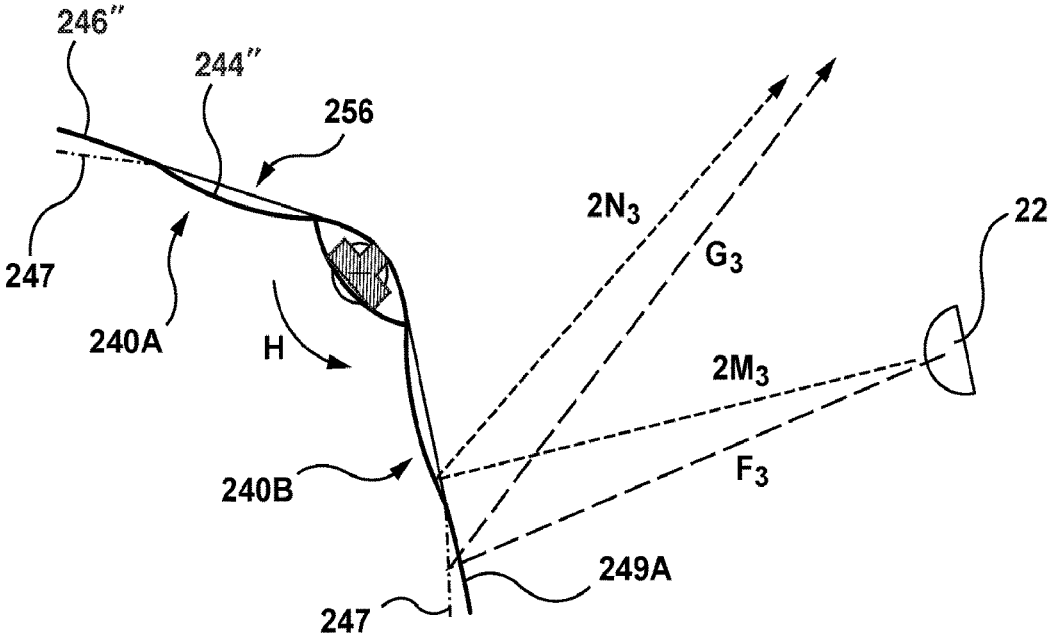
FIG. 9C is a cross-section of the paddle element and the rod of FIG. 9B, rotated to a third position.
Figure 9D:
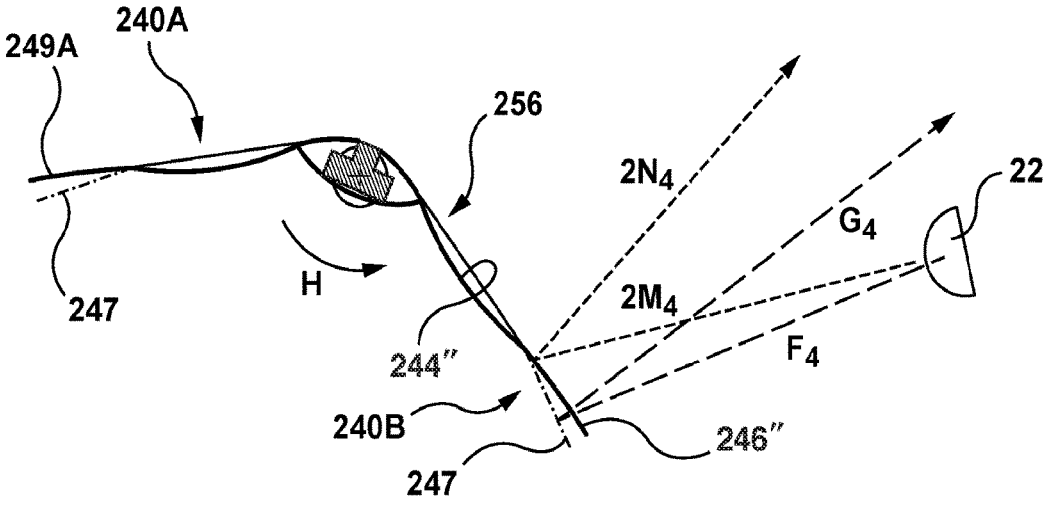
FIG. 9D is a cross-section of the paddle element and the rod of FIG. 9C, rotated to a fourth position.
Figure 9E:
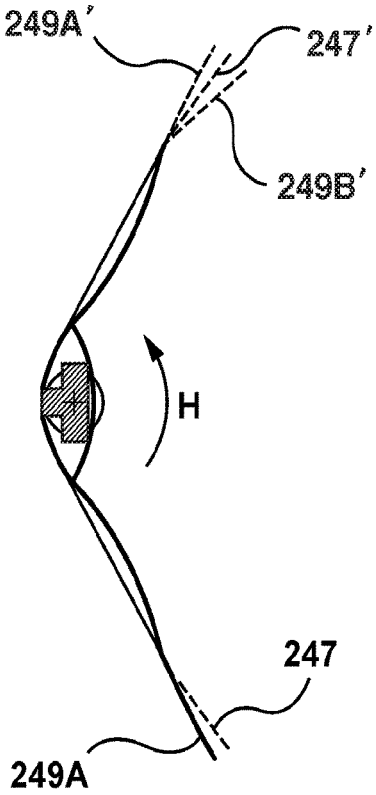
FIG. 9E is a cross-section of an embodiment of the paddle element of the invention in which one of the middle parts and the side parts adjacent thereto are all non-coplanar relative to each other.

In another embodiment, in at least a selected one of the paddle elements 238, the side parts 249A, 249B and the middle part 247 preferably are non-coplanar (FIG. 9E).

Figure 9F:
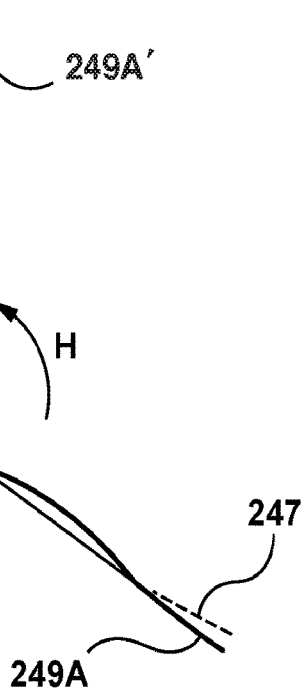
FIG. 9F is a cross-section of an embodiment of the paddle element of the invention in which one of the middle parts and the side parts adjacent thereto are coplanar relative to each other.

In an alternative embodiment, in at least a selected one of the paddle elements 238, the middle part 247 and the side part(s) preferably are substantially coplanar (FIG. 9F).

Those skilled in the art would appreciate that the mounting elements 276 are formed in order to locate the respective paddle elements 238 relative to each other in their respective predetermined positions and retain the paddle elements therein. It would also be appreciated by those skilled in the art that the mounting elements may be formed in any suitable manner. In one embodiment, each mounting element 276 preferably includes one or more first region 282 formed for engagement with the inner connector 260, to position the paddle elements 238 in the respective predetermined locations therefor (FIG. 8D). It is preferred that the first region 282 is substantially planar (FIG. 8D).

Preferably, the first region 282 of each mounting element 276 is located at a predetermined position located radially relative to each other mounting element 276 adjacent thereto, for positioning the paddle elements 238 in the respective predetermined locations therefor (FIG. 7C). The mounting element 276 preferably also includes a second section 283 thereof that may be partially engaged by the side connectors 262, 264 when the paddle element 238 is mounted on the mounting element 276 (FIGS. 8D, 8E).

Figure 10A:
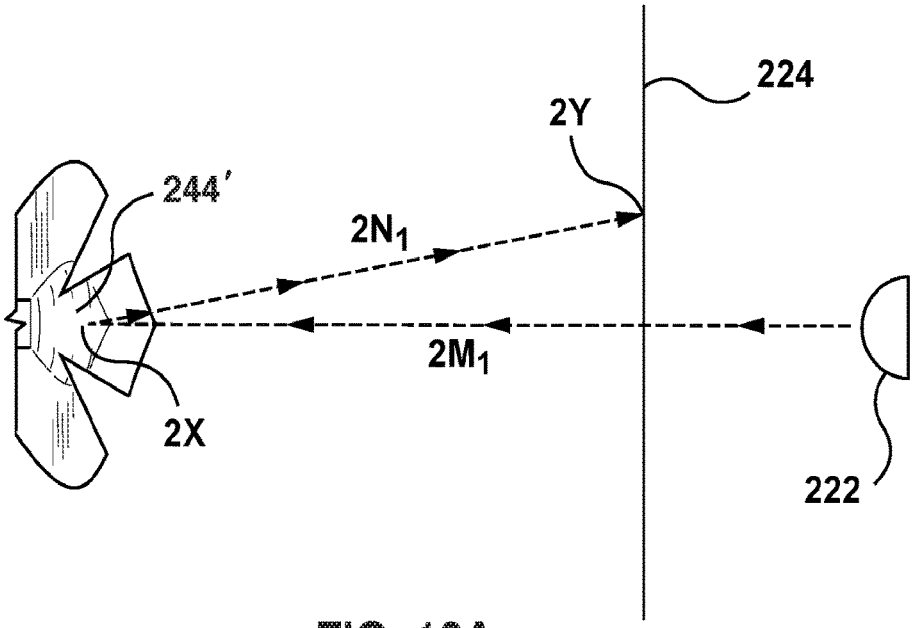
FIG. 10A is a top view of a portion of the paddle element positioned as shown in FIG. 9A and certain other elements of the flame simulating assembly.
Figure 10B:
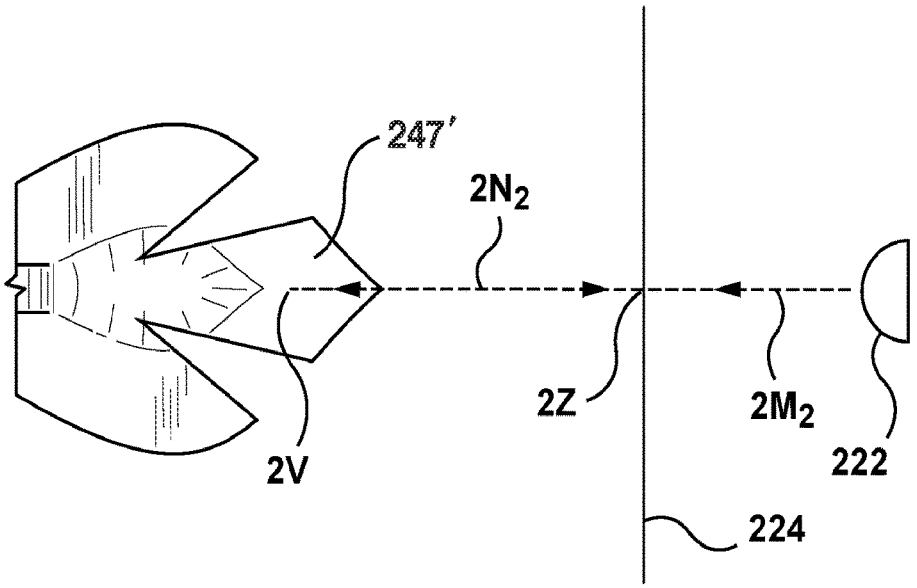
FIG. 10B is a top view of the portion of the paddle element positioned as shown in FIG. 9B and certain other elements of the flame simulating assembly.

In use, the light source is energized. and the flicker element is rotated about the rod's axis. When the flicker element is rotating, the light from the light source is directed to the reflective surface intermittently, to intermittently provide a first reflected light reflected from the middle part 247, a second reflected light reflected from the side part(s) 249A, 249B, and a third reflected light reflected from the non-planar region 244 to the screen to provide the images of flames on the screen. The images of flames 226 include respective portions thereof formed by the first reflected light and the second reflected light and the third reflected light, the first reflected light and the second reflected light having a different intensity on the screen relative to the third reflected light (FIGS. 10A, 10B).

It will be understood that the light from the light source 222 is reflected from all parts of the reflective surface 242. For instance, the light is also reflected from the base regions 257A, 257B toward the screen 224 as the flicker element is rotated, when the base regions 257A, 257B are appropriately positioned.

As can be seen in FIGS. 8B and 8E, it is preferred that the central region 244 of each of the body portions 240A, 240B of the paddle element 238 is generally convex on the first side 254 thereof (FIG. 8B) and generally concave on the second side 256 thereof (FIG. 8E). Due to the convex and concave regions, the body portions 240A, 240B are formed to have generally cupped shapes, i.e., they are non-planar, once the paddle element 238 is mounted on the rod 234.

It will be understood that the extent of the convexity and concavity of the central regions 244 is somewhat exaggerated as illustrated in FIGS. 8B and 8E and 9A-9D. Also, the convexity and concavity of the central regions 244 is not shown in FIGS. 7C, 8C, and 8D for clarity of illustration.

In use, as described below, the light forming the images 226 generally appears to vary in intensity within the images 226. This variation in intensity enhances the realistic effect provided by the assembly 220, as such variation is similar to variations in light intensity observable in flames in a real wood or coal fire, or a fire consuming other combustible materials. It is believed that the variation in light intensity within the image 226 is due, at least in part, to the cupped shapes of the body portions 240A, 240B. The intermittent nature of the reflection of the light from the flicker element 232 also contributes to the seemingly random fluctuations in the reflected light intensity. As will be described, it is also believed that the variation in light intensity within the images is also partly due to the forms of the middle part 247 and the side parts 249A, 249B. The different positioning of the middle part 247 and the side parts 249A, 249B relative to the perimeter plane "2PR" is also believed to cause variations in light intensity within the images of flames 226.

As noted above, part of the light from the light source 222 reflected from a body portion 240 is reflected from the (substantially planar) base regions 257A, 257B, and another part of the light reflected from such body portion 240 is reflected from the convex or concave region "2J" or "2K", as the case may be. Additional light is reflected from the middle part 247 and the side parts 249A, 249B.

It will be understood that, as the flicker element 232 is rotated, the intensity of the light that is reflected by each body portion 240 and directed to the screen 224 to form the image of flames varies. This is thought to be because the light from the light source 222 is directed to the moving (i.e., rotating) body portion, causing the light to be reflected, at least in part, sequentially from the substantially planar base regions 257A, 257B, the non-planar central region 244, and the middle part 247 and the side parts 249A, 249B.

As can be seen in FIG. 7B, in one embodiment, the flame simulating assembly 220 preferably includes a flame effect element 248 located along the path of the light from the light source that is reflected from the flicker element 232 toward the screen 224. Preferably, the flame effect element 248 includes one or more apertures therein through which the reflected light is directed, for forming the light received on the screen into flame-like shapes or configurations. In FIG. 7B, the light from the light source 222 is schematically represented by arrow "2M", and the light reflected from one of the paddle elements 238 to the predetermined region 245 on the screen 224 is schematically represented by arrow "2N".

In FIGS. 9A-9D, the middle part 247 is shown as being bent so that it is non-coplanar with the perimeter plane "2PR". As illustrated in FIGS. 9A-9D, the side parts are coplanar with the perimeter plane "2PR". Other arrangements are illustrated in FIGS. 9E and 9F. The flicker element 232 is rotated in the direction indicated by the arrow "H".

As can be seen in FIG. 9A, on the first side 254 of the body portion 240A, the central region 244' is somewhat convex. When the paddle element 238 is in the position shown in FIG. 9A, the light from the light source is at least partially directed to the slightly convex central region 244', and is reflected from the central region 244' toward the screen via the aperture(s) of the flame effect element 248 (not shown in FIG. 9A). It will be understood that the light is also reflected from the base regions 257A, 257B, however, such reflected light is omitted for clarity of illustration. In FIG. 9A, the light from the light source is schematically represented by the arrow "$2M_1$", and the light reflected from the central region 244' is schematically represented by the arrow "$2N_1$". The light from the light source 222 that is directed to the middle part 247 is also schematically represented by the arrow "$F_1$", and the light reflected from the middle part 247 is schematically represented by the arrow "$G_1$". It will also be understood that the reflected light "$2N_1$" and "$G_1$" is directed through the aperture(s) of the flame effect element to the screen 224 (not shown in FIGS. 9A-9D). The light that is reflected from the side parts is also omitted from FIG. 9A, for clarity of illustration.

In FIG. 9B, the rod 234 has rotated in the direction indicated by arrow "H" so that the paddle element 238 is in a different position (i.e., relative to its position illustrated in FIG. 9A) in respect of the light source 222. In FIG. 9B, the light from the light source 222 is schematically represented by the arrow "$2M_2$", and the reflected light is schematically represented by the arrow "$2N_2$". The light represented by the arrow "$2M_2$" is shown as being reflected from one or both of the side parts 249A, 249B. Because some of the light is reflected from the substantially planar side parts 249A, 249B, rather than the convex surface 244', the light reflected from the side parts 249A, 249B as projected onto the screen 224 would have a slightly different intensity than the light reflected from the central region 244'. The light from the light source that is directed to the middle part 247 is also schematically represented by the arrow "$F_2$", and the light reflected from the middle part 247 is schematically represented by the arrow "$G_2$". Due to the different positioning of the middle part 247 relative to the side parts 249A, 249B, the light reflected from the middle part 247 is directed toward a different location on the screen.

In FIG. 9C, the paddle element 238 is shown after it has been rotated further in the direction indicated by the arrow "H". In FIG. 9C, the second side 256 of the body portion 240B is exposed to the light from the light source 222. In this position, the light is also at least partially reflected from the central region 244", the light being represented by the arrows "$2M_3$" and "$2N_3$". The central region 244" on the second side 256 is concave. It will be understood that light is also reflected, at this point, from the base regions 257A, 257B, however, such reflected light is omitted for clarity of illustration. The light from the light source 222 that is directed to the middle part 247 is also schematically represented by the arrow "$F_3$", and the light reflected from the middle part 247 is schematically represented by the arrow "$G_3$". Due to the different positioning of the middle part 247 relative to the base regions 257A, 257B, the light reflected from the middle part 247 is directed toward a different location on the screen.

In FIG. 9D, the paddle element 238 is shown as having been rotated further in the direction indicated by the arrow "H" (relative to the position thereof illustrated in FIG. 9C), so that the light from the light source 222 is at least partially reflected from the substantially planar perimeter region 246". The light reflected from the base regions 257A, 257B is schematically represented by the arrow "$2N_4$". In this situation also, because the light is reflected from the substantially planar side parts 249A, 249B, rather than the concave surface 244", the light reflected from the side parts 249A, 249B as directed onto the screen 224 would have a slightly different intensity than the light reflected from the central region 244". The light from the light source 222 that is directed to the middle part 247 is also schematically represented by the arrow "$F_4$", and the light reflected from the middle part 247 is schematically represented by the arrow "$G_4$". Due to the different positioning of the middle part 247 relative to the side parts 249A, 249B, the light reflected from the middle part 247 is directed toward a different location on the screen.

As noted above, the positions of the side parts 249A, 249B and the middle part 247 relative to each other may vary, depending on how the paddle element 238 bends when it is mounted on the mounting element. In FIG. 9E, on one of the body portions, the side parts and the middle part are shown as being non-coplanar with each other. The middle part and the two side parts are identified for convenience by reference numerals 247', 249A', and 249B' respectively.

As noted above, the middle part and the side parts may be substantially coplanar. This situation is illustrated in FIG. 9F, where only one side part is identified by reference numeral 249A" for convenience. It will be understood that the middle part and the other side part are not identified in FIG. 9F for clarity of illustration.

It will also be understood that, as described above, the flicker element preferably includes a number of paddle elements positioned along the rod body. The other paddle elements on the rod are omitted from FIGS. 9A-9F for clarity of illustration. In addition, the locations of the middle part and the side parts relative to each other are exaggerated in FIG. 9E for clarity of illustration.

It is believed that the radial positioning of the paddle elements 238 relative to each other, to an extent, also causes the realistic variation in light intensity in the image 226 due to the different reflective surfaces of the body portions 240A, 240B being located to reflect the light from the light source(s) 222 in turn as the flicker element 232 is rotated about the rod's axis 236.

For example, in FIG. 10A. a top view of the situation illustrated in FIG. 9A is provided. The light from the light source 222 is represented by the arrow "$2M_1$", and as illustrated, it is reflected from the central region 244'. The light reflected from the central region 244' toward the screen 224 is represented by the arrow "$2N_1$". For clarity of illustration, the point on the central region 244' at which the light from the light source 222 is reflected toward the screen 224 is identified as "2X". As can be seen in FIG. 10A, the light that is reflected from the central region 244' produces an image of flames, or part thereof, at a point identified as "2Y" on the screen.

In FIG. 10B, a top view of the situation illustrated in FIG. 9B is provided. As can be seen in FIGS. 9A and 9B, in FIG. 9B, the rod has rotated about its axis from the position illustrated in FIG. 9A. The light from the light source 222 is represented by the arrow "$2M_2$" and the light reflected from the middle part 247 is schematically represented by the arrow "$2N_2$". The light is shown as being reflected from a point "2V" on the middle part 247. As illustrated in FIG. 10B, the light that is reflected from the perimeter region 246' is directed substantially orthogonally to the axis 236 of the rod 234, and intersects the screen at a point identified for clarity of illustration as "2Z".

In FIG. 10B, the light is schematically illustrated as being reflected from the middle part 247. As noted above, the form (i.e., planar or not) and position of the middle part (i.e., relative to the side parts) after mounting on the rod may vary from one paddle element to another. It will be understood that the middle element 247 is shown as being substantially planar in FIG. 10B for clarity of illustration.

From FIGS. 10A and 10B, it can be seen that the different shapes of the central region 244 (i.e., non-planar) and the middle part 247 may result in the light from the light source 222 being reflected in slightly different directions toward the screen 224 as the rod 234 rotates. For clarity of illustration, the extent to which the locations "2Y" and "2Z" on the screen are different is exaggerated. It will be understood that a number of elements of the flame simulating assembly 220 are omitted from FIGS. 10A and 10B, also for clarity of illustration. It will also be understood that the light reflected from the other central region 244", as illustrated in FIG. 9C, is also directed to a location on the screen that is other than the location on the screen to which the light reflected from the other side of the middle part 247 is directed.

Another benefit that is believed to result from the arrangement of the elements of the assembly 220 is the virtual elimination of incidental partially transverse flashes of light on the screen 224. This benefit is believed to be due to the generally consistent positioning of the paddle elements 238 relative to the screen 224, i.e., because the paddle elements 238 are positioned by the respective mounting elements 276 in the respective predetermined positions therefor. It will be understood that the rod 234 preferably is positioned so that its axis 236 is substantially parallel to the screen 224. The light from the light source is directed toward the body portions 240A, 240B in a direction that is substantially orthogonal to the axis 236, and aligned with an aperture in the flame effect element. It is believed that the elimination of the incidental partially transverse flashes of light is due to this arrangement, and the manner in which each paddle element is secured in position on each mounting element respectively.

As can be seen, for instance, in FIGS. 7A and 7B, the flame simulating assembly 220 preferably also includes a simulated fuel bed 292. Those skilled in the art would appreciate that the simulated fuel bed 292 may be formed in any suitable manner, and made of any suitable materials. In one embodiment, the simulated fuel bed 292 preferably includes one or more simulated fuel elements 294 supported by a platform 296.

Those skilled in the art would also appreciate that the elements 294 may be made of any suitable material(s). The simulated fuel elements 294 preferably are at least partially light-transmitting. Preferably, the simulated fuel elements 294 are at least partially translucent, and/or at least partially transparent. In one embodiment, it is preferred that the elements 294 are, for example, pieces of cut glass. Alternatively, the fuel elements 294 may be made of acrylic. The fuel elements 294 preferably are formed into any suitable shape(s). The fuel elements 294 preferably are located by the platform or support element 296 that positions at least some of the fuel elements 294 adjacent to the screen 224.

The fluctuations in the light that is reflected toward the screen are, in part, the result of the differences in forms and positioning of the parts and regions of the reflective surfaces 242, as illustrated schematically in FIGS. 9A-9F, and as described above. In addition, the light that is reflected from the flicker element fluctuates in intensity because of the gaps between the paddle elements, i.e., each paddle element reflects the light only intermittently as the flicker element rotates.

Those skilled in the art would appreciate that, although the embodiments of methods of the invention as described above indicate that steps of the methods are to be performed in a sequence, certain of the steps may alternatively be performed in alternative sequences. For instance, in the method of providing images of flames, the elements of the flame simulating assembly generally may be provided in any suitable order.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A flame simulating assembly comprising:

at least one light source for producing light;

a screen to which the light from said at least one light source is directed, to provide a plurality of images of flickering flames thereon;

a rotatable flicker element comprising:

an elongate rod defined by an axis thereof about which the rod is rotatable;

a plurality of paddle elements located in respective predetermined locations on the rod, each said paddle element comprising at least one body portion having at least one reflective surface thereon, said at least one reflective surface comprising a central region and a perimeter region at least partially located around the central region, the perimeter region at least partially defining a perimeter plane;

the paddle elements being located in the respective predetermined locations therefor to position the perimeter plane substantially perpendicular to the axis, for intermittently reflecting the light from said at least one light source from said at least one reflective surface to predetermined regions on the screen respectively as the flicker element rotates about the axis, to provide the images of flickering flames on the screen;

the central region being substantially non-planar and the perimeter region being at least partially planar, to cause the light reflected therefrom to the screen as the flicker element rotates to have varying intensity at the respective predetermined regions on the screen; and the perimeter region comprising at least one middle part and [at least one] *two* side [part] *parts*, said at least one middle part being at least partially defined by at least one channel [partially separating said at least one middle part and said at least one side part] *between the two side parts*.

2. The flame simulating assembly according to claim 1 in which: said [at least one] *two* side [part comprises] *parts comprise* a first side part and a second side part; said at least one channel comprises first and second channels *that extend from the central region to the perimeter region*; [and said] *further comprising the* at least one middle part *that* is at least partially defined by the first and second channels, the first channel being located between said at least one middle part and the first side part, and the second channel being located between said at least one middle part and the second side part.

3. The flame simulating assembly according to claim 2 in which, in at least a selected one of the paddle elements, the first and second side parts are substantially coplanar relative to each other.

4. The flame simulating assembly according to claim 1 in which, in at least a selected one of the paddle elements, said at least one middle part is non-planar.

5. The flame simulating assembly according to claim 3 in which, in at least a selected one of the paddle elements, said at least one middle part is non-coplanar with said at least two side parts.

6. The flame simulating assembly according to claim 3 in which, in at least a selected one of the paddle elements, said [at least] two side parts and said at least one middle part are non-coplanar.

7. The flame simulating assembly according to claim 1 in which, in at least a selected one of the paddle elements, said at least one middle part and said at least one side part are substantially coplanar.

8. The flame simulating assembly according to claim 1 in which, in at least a selected one of the paddle elements, said at least one middle part and said at least one side part are substantially non-coplanar.

9. A flame simulating assembly comprising:

at least one light source for producing light;

a screen to which the light from said at least one light source is directed, to provide a plurality of images of flickering flames thereon;

a rotatable flicker element comprising:

an elongate rod defined by an axis thereof about which the rod is rotatable;

a plurality of paddle elements located in respective predetermined locations on the rod, each said paddle element comprising at least one body portion having at least one reflective surface thereon, said at least one reflective surface comprising a central region and a perimeter region at least partially located around the central region, the perimeter region at least partially defining a perimeter plane;

the paddle elements being located in the respective predetermined locations therefor to position the perimeter plane substantially perpendicular to the axis, for intermittently reflecting the light from said at least one light source from said at least one reflective surface to predetermined regions on the screen respectively as the flicker element rotates about the axis, to provide the images of flickering flames on the screen;

said at least one body portion comprising a first side and an opposed second side thereof, and at least a selected one of the first and second sides comprising said at least one reflective surface;

the central region on the first side being at least partially convex relative to the perimeter region on the first side and the central region on the second side being at least partially concave relative to the perimeter region on the second side; and the perimeter region comprising at least one middle part and at least one side part, said at least one middle part being at least partially defined by at least one channel separating said at least one middle part and said at least one side part.

10. The flame simulating assembly according to claim 9 in which:

each said paddle element comprises two body portions connected by a bridge portion;

the bridge portion comprises an inner connector and a pair of outer connectors located on opposite sides of the inner connector.

11. The flame simulating assembly according to claim 9 in which the rod comprises at least one rod body thereof.

12. The flame simulating assembly according to claim 9 in which the rod comprises a plurality of mounting elements located on said at least one rod body for positioning the paddle elements in the respective predetermined locations therefor.

13. The flame simulating assembly according to claim 12 in which the mounting elements are spaced substantially equidistant apart from each other along said at least one rod body.

14. The flame simulating assembly according to claim 13 in which each said mounting element comprises at least one first region formed for engagement with the inner connector, to position the paddle elements in the respective predetermined locations therefor.

15. The flame simulating assembly according to claim 13 in which said at least one first region is substantially planar.

16. The flame simulating assembly according to claim 14 in which said at least one first region of each said mounting element is located at a predetermined position located radially relative to each other, for positioning the paddle elements in the respective predetermined locations therefor.

17. A method of providing images of flames comprising:

providing at least one light source for producing light;

providing a rotatable flicker element comprising: an elongate rod defined by an axis thereof;

a plurality of paddle elements located in respective predetermined locations on the rod, each said paddle element comprising at least one body portion with at least one reflective surface thereon, said at least one reflective surface being formed to comprise [a substantially planar region] *a perimeter region* at least partially defining a perimeter plane and a non-planar region, the perimeter region comprising at least one middle part and [at least one] *two* side [part] *parts*, said at least one middle part being at least partially defined by at least one channel [separating said at least one middle part and said at least one side part] *between the two side parts*;

the paddle elements being located to position the perimeter plane substantially perpendicular to the axis;

providing a screen for displaying a plurality of images of flames thereon;

positioning the rod with the axis thereof substantially parallel to the screen, to locate said at least one reflective surface on each of the paddle elements intermittently in a path of the light from said at least one light source as the rod rotates about the axis, for reflecting the light from said at least one light source to the screen as the flicker element rotates relative to the screen;

rotating the flicker element about the axis; and when the flicker element is rotating, directing the light from said at least one light source to said at least one reflective surface intermittently, to intermittently provide a [first] reflected light reflected from said at least one middle part, [a second reflected light reflected] from [said at least one] *the two* side [part] *parts*, and [a third reflected light reflected] from the non-planar region to the screen to provide the images of flames, said images comprising respective portions thereof formed by the [first] reflected light [and the second reflected light and the third reflected light, the first reflected light and the second reflected light having a different intensity on the screen relative to the third reflected light].

*18. The flame simulating assembly according to claim 1, wherein the channel extends from the central region to an outer surface of the perimeter region.*

*19. A flame simulating assembly comprising:*

*at least one light source for producing light;*

*a screen to which the light is directed, to provide images of flickering flames thereon;*

*a flicker element that includes:*

*a rod defined by an axis thereof about which the rod is rotatable;*

*paddle elements located along the rod, each paddle element including a reflective surface, the reflective surface including a central region and a perimeter region at least partially located around the central region, the paddle elements positioned for reflecting the light from the reflective surface to regions on the screen as the flicker element rotates about the axis, to provide images of flickering flames on the screen;*

*the central region being at least partially non-planar and the perimeter region being at least partially planar, to cause the light reflected therefrom to pass*

*to the screen as the flicker element rotates to have varying intensity at the respective regions on the screen; and*

*the perimeter region including at least two side parts separated by at least one channel that extends from the central region to an outer surface of the perimeter region.*

*20. The flame simulating assembly according to claim 19 in which the at least two side parts include a first side part and a second side part, the at least one channel includes first and second channels that extend from the central region to the perimeter region, the at least one middle part at least partially defined by the first and second channels, the first channel being located between the at least one middle part and the first side part, and the second channel being located between said at least one middle part and the second side part.*

*21. The flame simulating assembly according to claim 19, each side part of the at least two side parts including a base region that is adjacent to a respective side part and adjacent to the central region.*

* * * * *